US012743331B2

(12) United States Patent
Reitbauer et al.

(10) Patent No.: US 12,743,331 B2
(45) Date of Patent: Sep. 22, 2026

(54) STRUCTURED SOFTWARE DELIVERY AND OPERATION AUTOMATION

(71) Applicant: Dynatrace LLC, Waltham, MA (US)

(72) Inventors: Alois Reitbauer, Linz (AT); Dirk Wallerstorfer, Linz (AT); Andreas Grabner, Linz (AT)

(73) Assignee: Dynatrace LLC, Boston, MA (US)

( * ) Notice: Subject to any disclaimer, the term of this patent is extended or adjusted under 35 U.S.C. 154(b) by 136 days.

(21) Appl. No.: 18/382,793

(22) Filed: Oct. 23, 2023

(65) Prior Publication Data

US 2024/0045756 A1 Feb. 8, 2024

Related U.S. Application Data

(62) Division of application No. 17/174,946, filed on Feb. 12, 2021, now Pat. No. 11,822,423.

(Continued)

(51) Int. Cl.

*G06F 11/00* (2006.01)
*G06F 8/35* (2018.01)
*G06F 11/07* (2006.01)
*G06F 11/30* (2006.01)
*G06F 11/34* (2006.01)

(52) U.S. Cl.

CPC ............ *G06F 11/0793* (2013.01); *G06F 8/35* (2013.01); *G06F 11/0706* (2013.01); *G06F 11/079* (2013.01); *G06F 11/302* (2013.01); *G06F 11/3409* (2013.01); *G06F 11/3447* (2013.01); *G06F 11/3466* (2013.01)

(58) Field of Classification Search

CPC ............. G06F 11/0793; G06F 11/0709; G06F 11/3409; G06F 8/60; G06F 11/302; G06F 11/3452

See application file for complete search history.

(56) References Cited

U.S. PATENT DOCUMENTS

2014/0245262 A1* 8/2014 Hill ........................... G06F 8/30 717/120
2018/0300180 A1* 10/2018 Shepard .................... G06F 8/65

(Continued)

*Primary Examiner* — Charles Ehne

(74) *Attorney, Agent, or Firm* — Harness, Dickey & Pierce, PLC

(57) ABSTRACT

A system and method for the structured automation of the delivery and operation of software functionality is proposed. A declarative notation approach is used to describe automation sequences independently from concrete automation tools and services that may be used to execute the automation sequences. An automation service abstraction layer is introduced that hides concrete automation service characteristics from the declarative automation definition layer. The service abstraction layer enables a transparent change or update of concrete automation service without affecting automation sequences that use the corresponding service abstractions. For operation automation, the automation execution may be combined with causation-capable monitoring systems that both identifies critical changes of operating conditions for which automated remediation is indicated and corresponding root cause changes for those critical changes. The remediation automation may, on notification of such a critical change, identify and apply remediation actions that counteract the identified root cause changes.

12 Claims, 7 Drawing Sheets

Related U.S. Application Data

(60) Provisional application No. 62/977,117, filed on Feb. 14, 2020.

(56) References Cited

U.S. PATENT DOCUMENTS

| | | | | |
|---|---|---|---|---|
| 2019/0349421 | A1* | 11/2019 | Schincariol | G06F 9/5072 |
| 2020/0042426 | A1 | 2/2020 | Ambichl et al. | |
| 2020/0259700 | A1 | 8/2020 | Bhalla et al. | |
| 2021/0021491 | A1 | 1/2021 | Pasha et al. | |
| 2023/0078773 | A1 | 3/2023 | Woan et al. | |

* cited by examiner

Figure 1:
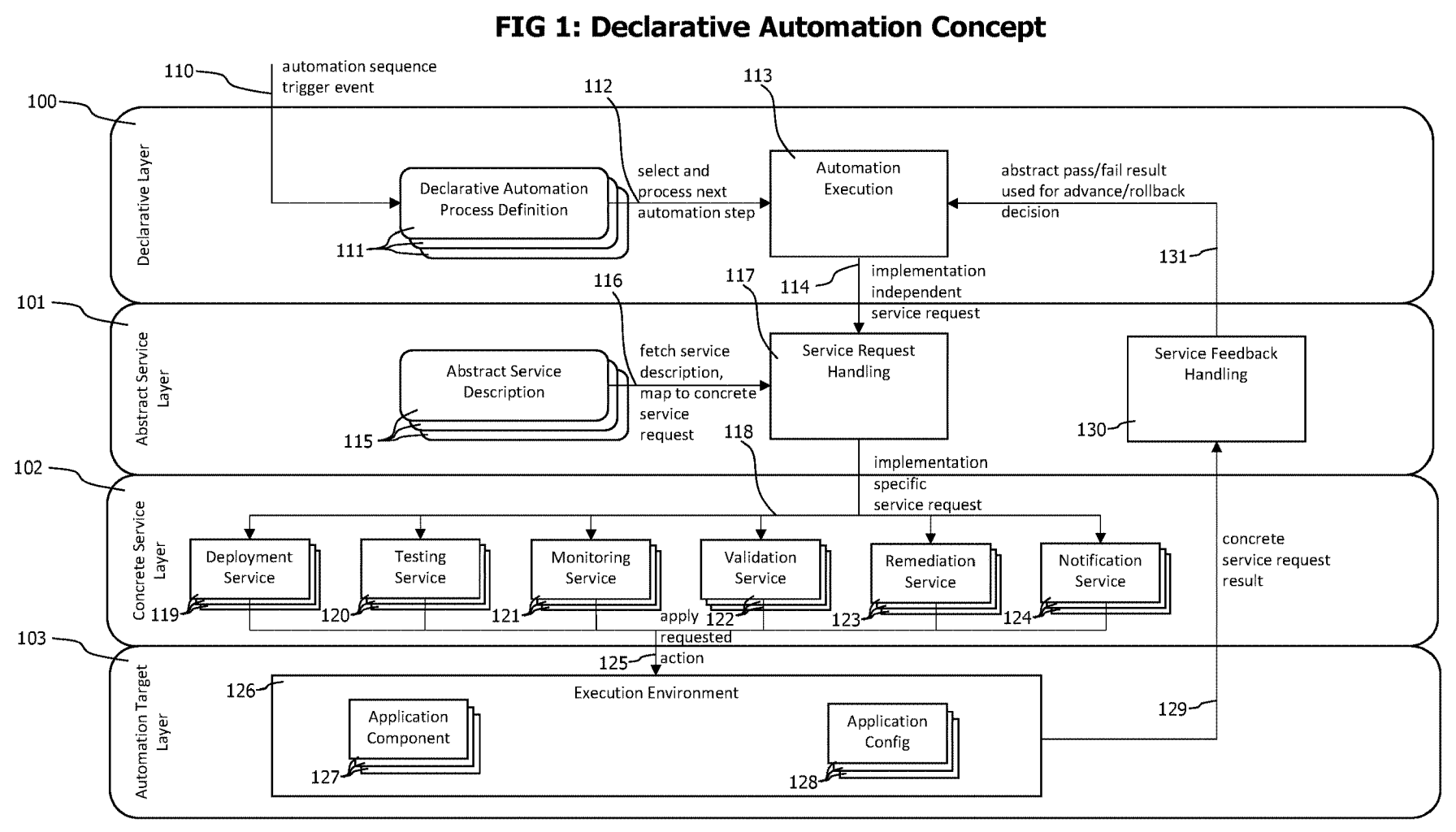

FIG 1: Declarative Automation Concept

Declarative Layer
100
Abstract Service Layer
101
Concrete Service Layer
102
Automation Target Layer
103 automation sequence trigger event
110
Declarative Automation Process Definition
111
select and process next automation step
112
Automation Execution
113
implementation independent service request
114
Abstract Service Description
115
fetch service description, map to concrete service request
116
Service Request Handling
117
implementation specific service request
118
Deployment Service
119
Testing Service
120
Monitoring Service
121
Validation Service
122
Remediation Service
123
Notification Service
124
apply requested action
125
Execution Environment
126
Application Component
127
Application Config
128
concrete service request result
129
Service Feedback Handling
130
abstract pass/fail result used for advance/rollback decision
131

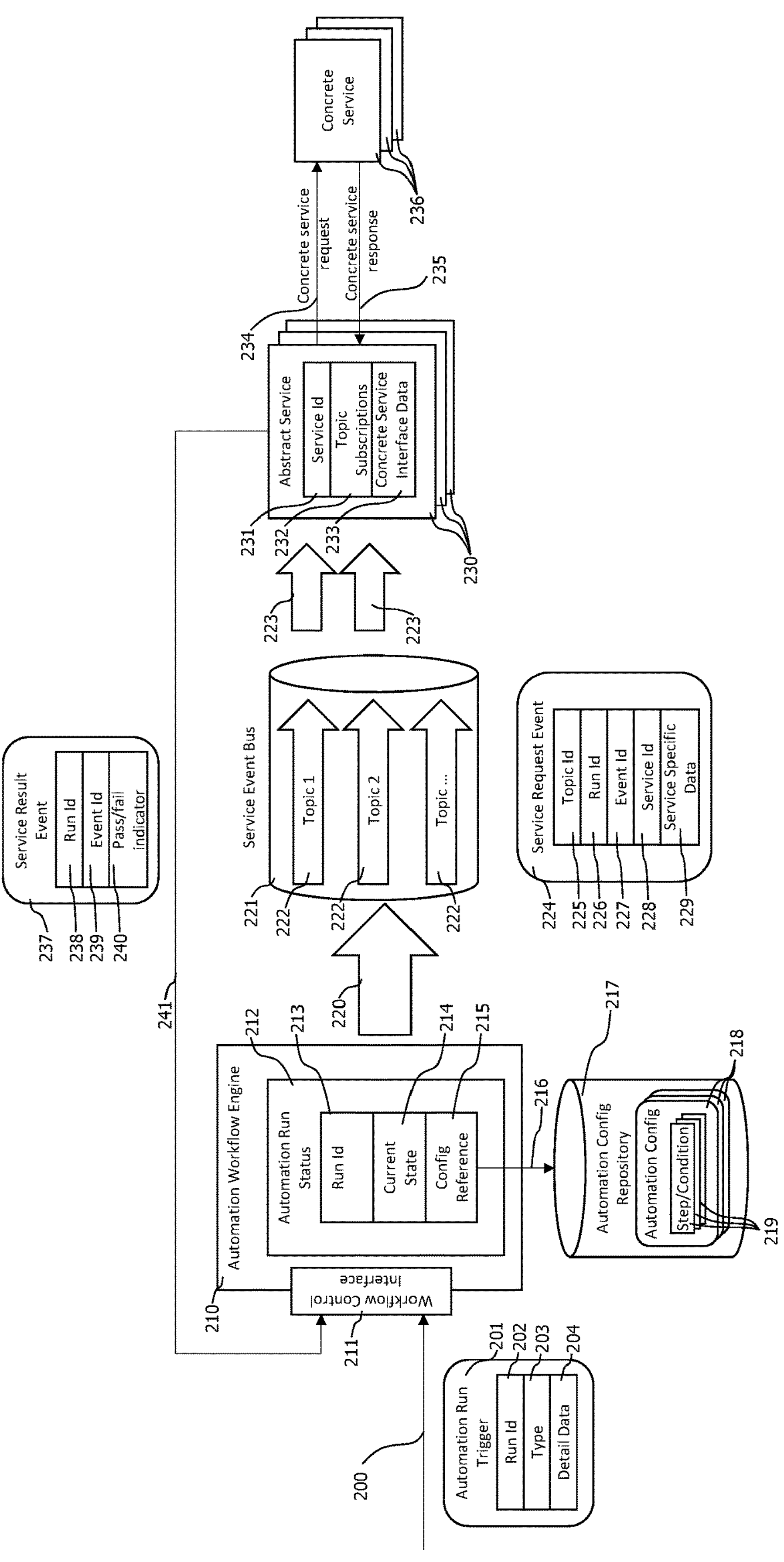
FIG 2: Exemplary Automation Architecture
Concrete Service
236
Concrete service request
Concrete service response
234
235
Abstract Service
Service Id
Topic Subscriptions
Concrete Service Interface Data
231
232
233
230
223
223
Service Event Bus
Topic 1
Topic 2
Topic ...
221
222
222
222
Service Result Event
Run Id
Event Id
Pass/fail indicator
237
238
239
240
Service Request Event
Topic Id
Run Id
Event Id
Service Id
Service Specific Data
224
225
226
227
228
229
241
220
Automation Workflow Engine
Automation Run Status
Run Id
Current State
Config Reference
212
213
214
215
216
Automation Config Repository
Automation Config
Step/Condition
217
218
219
210
Workflow Control Interface
211
200
Automation Run Trigger
Run Id
Type
Detail Data
201
202
203
204

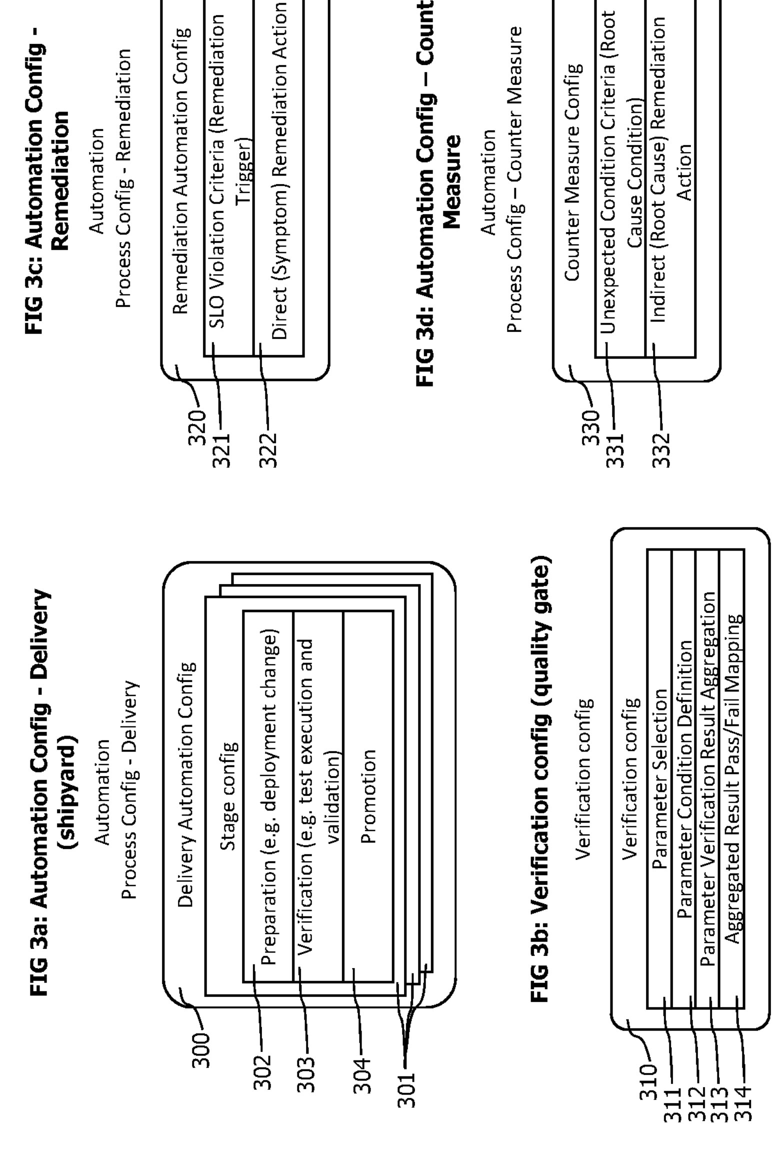
Exemplary Automation Configuration Records
FIG 3a: Automation Config - Delivery (shipyard)
Automation
Process Config - Delivery
Delivery Automation Config
Stage config
Preparation (e.g. deployment change)
Verification (e.g. test execution and validation)
Promotion
300
302
303
304
301
FIG 3b: Verification config (quality gate)
Verification config
Verification config
Parameter Selection
Parameter Condition Definition
Parameter Verification Result Aggregation
Aggregated Result Pass/Fail Mapping
310
311
312
313
314
FIG 3c: Automation Config - Remediation
Automation
Process Config - Remediation
Remediation Automation Config
SLO Violation Criteria (Remediation Trigger)
Direct (Symptom) Remediation Action
320
321
322
FIG 3d: Automation Config – Counter Measure
Automation
Process Config – Counter Measure
Counter Measure Config
Unexpected Condition Criteria (Root Cause Condition)
Indirect (Root Cause) Remediation Action
330
331
332

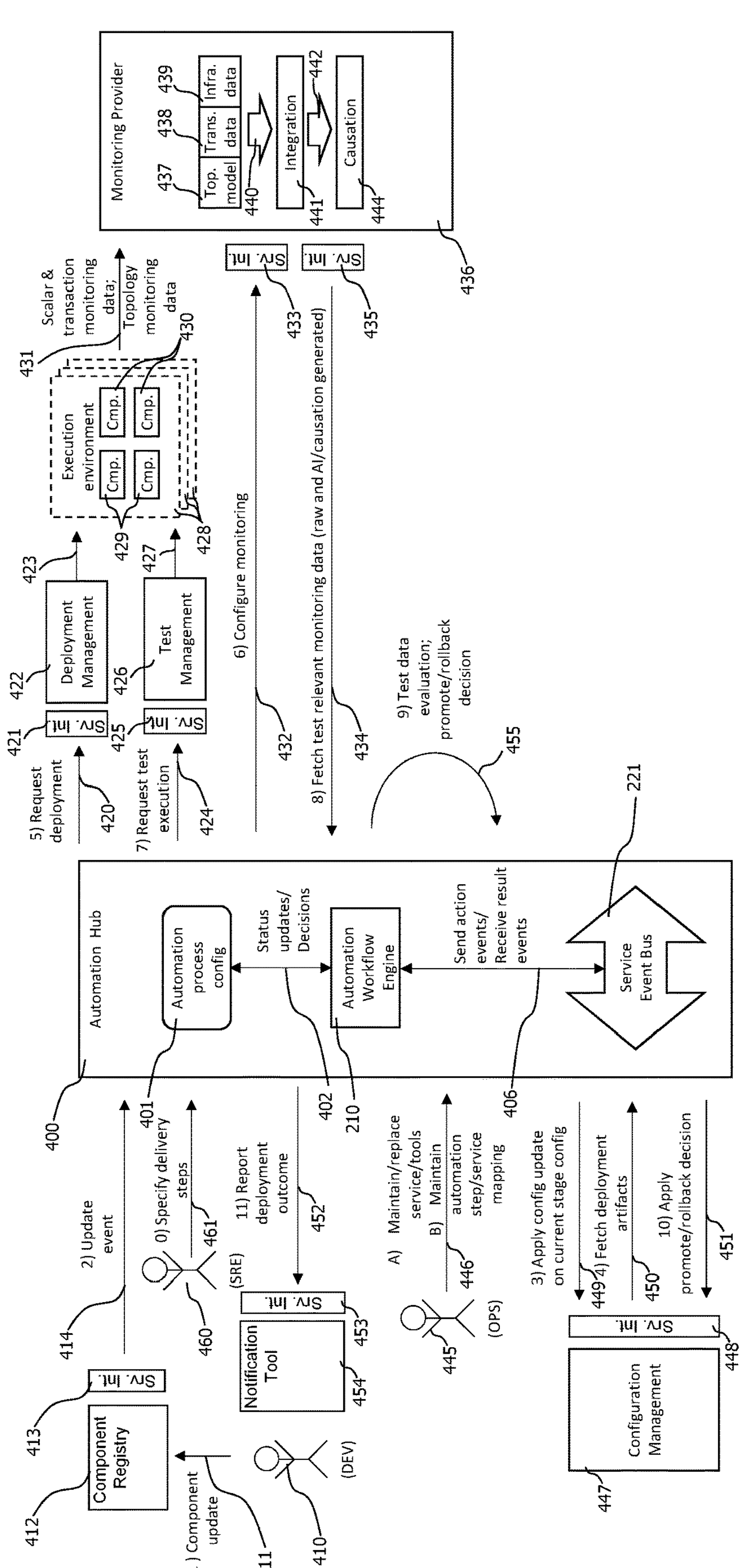
FIG 4: Exemplary Automated Delivery Sequence
Component Registry
412
413
Srv. Int.
1 ) Component update
411
410
(DEV)
2) Update event
414
0) Specify delivery steps
461
460
(SRE)
Notification Tool
453
454
Srv. Int.
11) Report deployment outcome
452
A) Maintain/replace service/tools
B) Maintain automation step/service mapping
446
445
(OPS)
3) Apply config update on current stage config
449
4) Fetch deployment artifacts
450
10) Apply promote/rollback decision
451
Configuration Management
447
448
Srv. Int.
400
Automation Hub
Automation process config
401
Status updates/ Decisions
402
Automation Workflow Engine
210
Send action events/ Receive result events
406
Service Event Bus
221
5) Request deployment
420
421
Srv. Int.
Deployment Management
422
423
7) Request test execution
424
425
Srv. Int.
Test Management
426
427
Execution environment
Cmp.
429
428
430
431
Scalar & transaction monitoring data; Topology monitoring data
6) Configure monitoring
432
433
Srv. Int.
8) Fetch test relevant monitoring data (raw and AI/causation generated)
434
435
Srv. Int.
9) Test data evaluation; promote/rollback decision
455
Monitoring Provider
436
Top. model
437
Trans. data
438
Infra. data
439
440
Integration
441
442
Causation
444

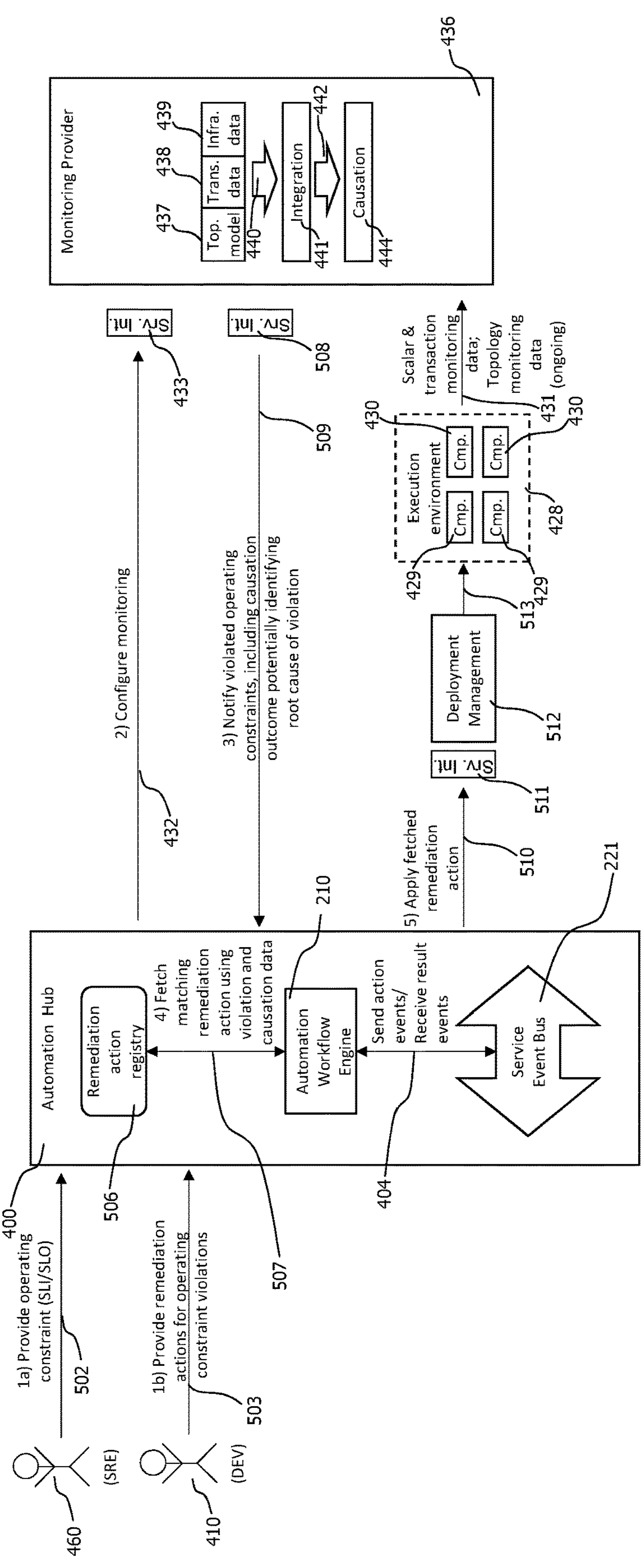
FIG 5: Exemplary Automation Remediation Sequence
460
(SRE)
410
(DEV)
1a) Provide operating constraint (SLI/SLO)
502
1b) Provide remediation actions for operating constraint violations
503
400
Automation Hub
Remediation action registry
506
4) Fetch matching remediation action using violation and causation data
507
Automation Workflow Engine
210
Send action events/ Receive result events
404
Service Event Bus
221
2) Configure monitoring
432
433
Srv. Int.
3) Notify violated operating constraints, including causation outcome potentially identifying root cause of violation
509
508
Srv. Int.
5) Apply fetched remediation action
510
Srv. Int.
511
Deployment Management
512
513
Execution environment
Cmp.
Cmp.
Cmp.
Cmp.
429
429
430
430
428
Scalar & transaction monitoring data; Topology monitoring data (ongoing)
431
Monitoring Provider
436
Top. model
437
Trans. data
438
Infra. data
439
440
Integration
441
442
Causation
444

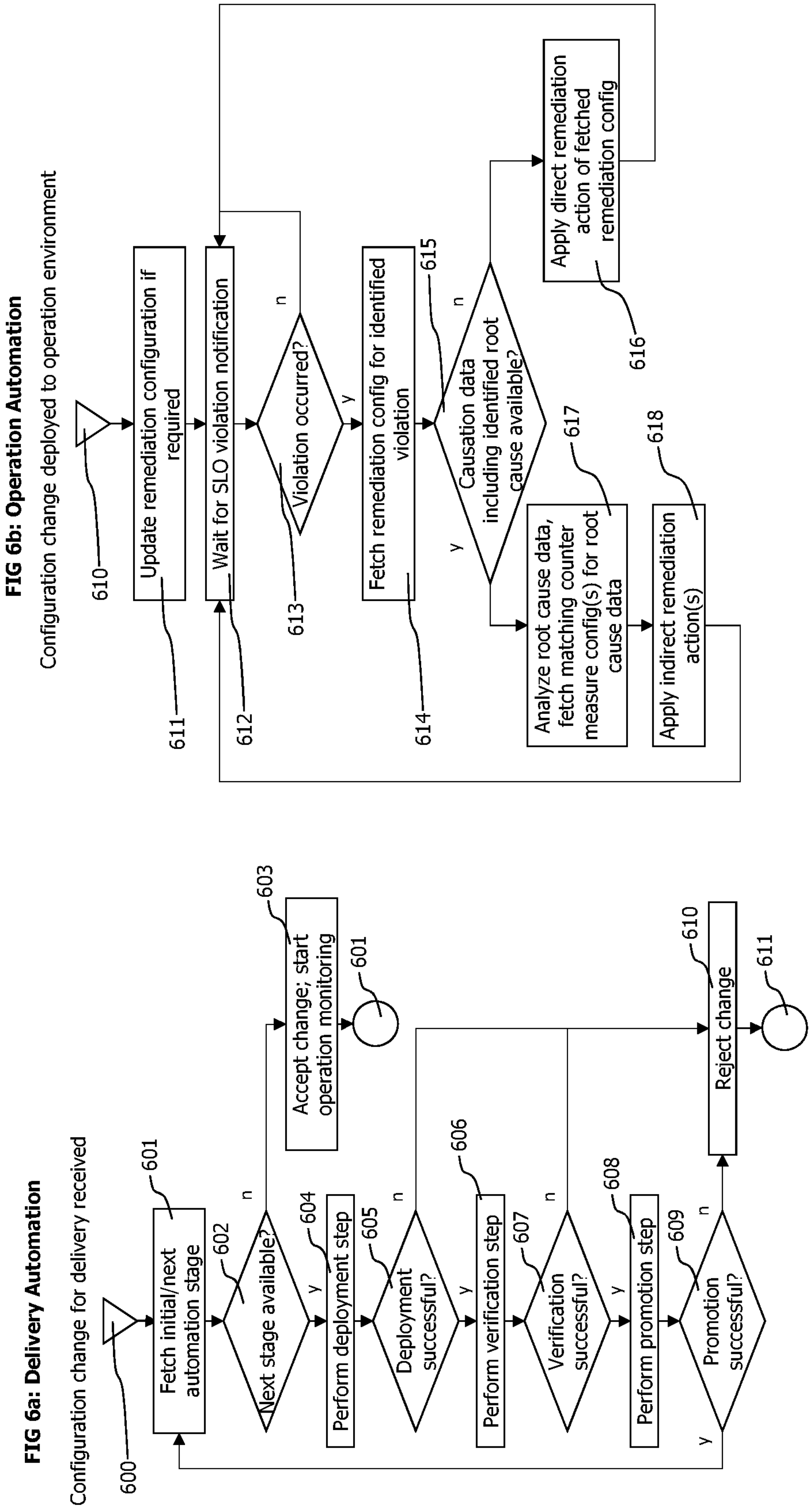
Exemplary Automation Processes
FIG 6a: Delivery Automation
Configuration change for delivery received
600
601
Fetch initial/next automation stage
602
Next stage available?
n
y
603
Accept change; start operation monitoring
601
604
Perform deployment step
605
Deployment successful?
n
y
606
Perform verification step
607
Verification successful?
n
y
608
Perform promotion step
609
Promotion successful?
n
y
610
Reject change
611
FIG 6b: Operation Automation
Configuration change deployed to operation environment
610
611
Update remediation configuration if required
612
Wait for SLO violation notification
613
Violation occurred?
n
y
614
Fetch remediation config for identified violation
615
Causation data including identified root cause available?
n
y
616
Apply direct remediation action of fetched remediation config
617
Analyze root cause data, fetch matching counter measure config(s) for root cause data
618
Apply indirect remediation action(s)

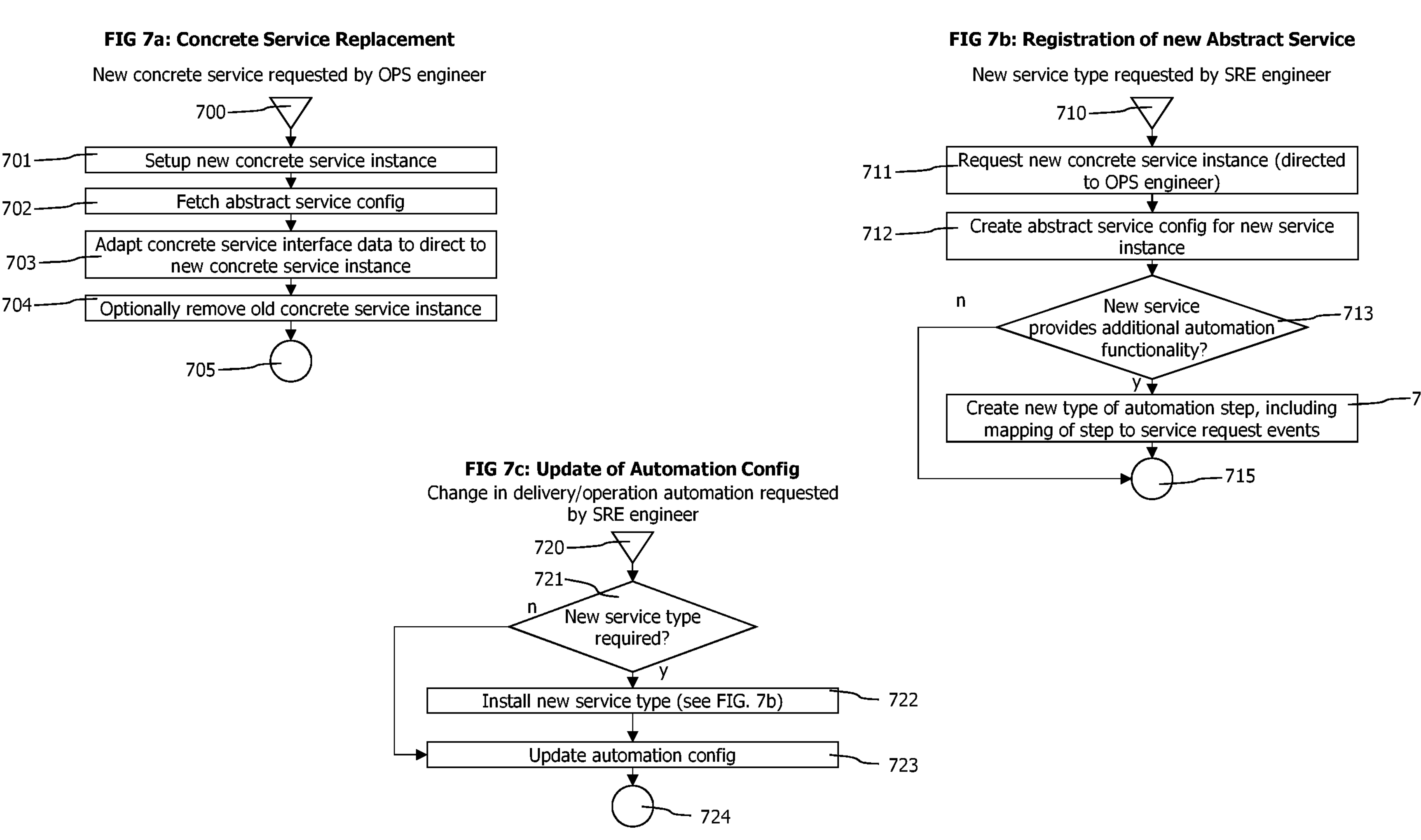
Exemplary Delivery/Operation Service Adaptation Processes
FIG 7a: Concrete Service Replacement
New concrete service requested by OPS engineer
700
701
Setup new concrete service instance
702
Fetch abstract service config
703
Adapt concrete service interface data to direct to new concrete service instance
704
Optionally remove old concrete service instance
705
FIG 7b: Registration of new Abstract Service
New service type requested by SRE engineer
710
711
Request new concrete service instance (directed to OPS engineer)
712
Create abstract service config for new service instance
n
New service provides additional automation functionality?
713
y
Create new type of automation step, including mapping of step to service request events
714
715
FIG 7c: Update of Automation Config
Change in delivery/operation automation requested by SRE engineer
720
721
n
New service type required?
y
Install new service type (see FIG. 7b)
722
Update automation config
723
724

STRUCTURED SOFTWARE DELIVERY AND OPERATION AUTOMATION

CROSS-REFERENCE TO RELATED APPLICATIONS

This application is a divisional of U.S. patent application Ser. No. 17/174,946, filed Feb. 12, 2021, which claims the benefit of U.S. Provisional Application No. 62/977,117, filed on Feb. 14, 2020. The entire disclosures of each of the above applications are incorporated herein by reference.

FIELD

The invention generally relates to the field of automating the delivery and operation of software functionality and more specifically to a delivery and operation automation approach that separates a declaratively specified automation process from concrete automation tools and services required to execute the automation process.

BACKGROUND

Modern, service-oriented application architectures separate application functionality into sets of loosely coupled, interacting service, where individual services are only responsible for a small portion of the overall application functionality.

Those applications are typically operated in highly flexible and elastic, container-based environments such as cloud computing systems, which provide various APIs to deploy, configure and scale application components running in those environments.

The combination of a service-oriented architecture that provides independently changeable application components and the ability of cloud computing systems that provides the foundations to execute those changes in an automated way create the foundation for agile application improvement and development. Automation is a key concept to leverage the features of those environment, as it enables software developing organizations to realize faster software delivery cycles. It is now possible to deploy such updates in weekly cycles. This is a vast improvement compared to quarterly or annual release cycles that were common a few years ago. Those fast release cycles greatly improve the adaptability of software products to changed operating condition, be they caused by changed customer frequency or behavior, changed execution environments or emerging bugs.

Before software components are delivered for usage by end-customers, they typically undergo sequences of rigorous testing and verification steps that evaluate e.g. functional, performance and security related aspects of the software components. Those test and verification steps typically require various tools that may be addressed via APIs using proprietary scripting interfaces. In addition, there are dependencies between all those steps, like e.g. a performance testing script should only be executed if a previously performed functional test was successful, and final deployment step to a production environment should only be performed if all previous steps where successful. Those dependencies are typically expressed in terms of tool specific interactions, like e.g. a script defined in scripting language of a tool used to perform a specific step contains a command that triggers the execution of the next step in the pipeline by another tool. This command is typically specific for the two communicating tools and exchanging one of those tools most probably also causes adaptations on at least the neighboring steps in the pipeline.

This creates a situation with various hard dependencies between those delivery tools which ends in a monolithic and hard to maintain delivery pipeline configuration. Performing changes to this pipeline, like exchanging tools or adding pipeline steps becomes a cumbersome and risky task, as due to the hard dependencies, desired effects of changes to one tool may likely be accompanied by undesired, potentially adverse effects to on other events.

This leads to software delivery pipelines that are created to enable software development organizations to provide software functionality in a fast and agile way, that is itself monolithic and static. This situation constitutes a considerable risk for software development organizations, as a failing or simply difficult to adapt delivery pipeline severely hampers their ability to react fast. Therefore, a delivery architecture is desired that provides the same adaptability and change-friendliness as the software it delivers.

Next to the automation of software delivery, also monitoring the execution of software in productive environments, the identification of undesired execution conditions and the application of corresponding counter measures to resolve or at least mitigate those undesired execution conditions, are target for pipeline like automation architectures. Similar problems and demands as for the software delivery use case can be identified for the software operation use case.

This section provides background information related to the present disclosure which is not necessarily prior art.

SUMMARY

This section provides a general summary of the disclosure, and is not a comprehensive disclosure of its full scope or all of its features.

The disclosed technology is directed to a structured architecture and framework for the definition, operation and maintenance of automated software delivery pipelines and software operation management systems. A service abstraction layer is used to hide the complexity of vendor specific delivery and operating tools and services, like tools to deploy and test software deliveries, to verify and analyze test results and to monitor and manage the execution of those components in an operative environment. This abstraction supports a frictionless maintenance or exchange of individual, vendor specific tools and services without impacting other areas of a software delivery pipeline or an operation monitoring and management environment.

The tools and service abstraction forms the base of a declarative configuration layer for software delivery and operation management environments that enables a designer of such an environment to create a definition of the environment that only describes the tasks that should be performed and the sequence in which they should be performed, in an abstract way that is independent of individual, vendor specific tools. An interpretation engine executes this definition and uses the service and tool abstraction layer to translate the abstract declarative statements into concrete service requests.

The isolation of an abstract declaration of software delivery and operation management system from its concrete realization provides the basis for different roles of persons involved in the design and operation of such a system. The role of a site reliability engineer may be reliable for the overall (abstract) definition of delivery and operation automation systems and define different delivery stages, used deployment and testing strategies or requirements for the promotion of a software component to a next delivery stage or to a productive environment.

An operations engineer may be responsible to install, configure and maintain appropriate specific delivery and operation management tools and services and to provide the definition of the tool abstraction that makes the specific tools and services available for an interpretation engine that executes abstract declarative definitions of software delivery and operation management systems.

A development engineer may provide additional or updated software components that are first conveyed through a delivery system, and if delivery is successful, deployed in an operational environment. For the management of those component in an operational environment, the development engineer may in addition provide structured remediation actions that may be applied to the components in an operative environment to react on observed, undesired behavior of the component.

Some embodiments of the disclosed technology may use messaging middleware systems that provide publish/subscribe based messaging delivery systems to implement the communication between an interpretation engine that executes declarative software delivery and operation management systems and the delivery and operation management tools and services that are used to implement those systems.

Yet other embodiments may provide configuration mechanisms for the automatic evaluation of software component test results to decide whether a component should be promoted to a next delivery step.

Still other embodiments may combine an automated operation management system with an operation monitoring system that is capable to identify causal relationships between different monitored undesired operating conditions, and to identify root causes for sets of causally related undesired operating conditions. The automated operating management system may in such a configuration define undesired operating conditions for which automatic remediation is required. The causality-aware monitoring system may, on occurrence of such undesired operating conditions that require automatic remediation, provide monitoring data that describes the causal chain that led to the undesired operating condition. The automated operation management may analyze the causal chain to identify the root cause for the triggering undesired operating condition and then apply an appropriate remediation action for the identified root cause.

Variant embodiments that combine an automated operation management system with a conventional operation monitoring system may only receive data describing unrelated abnormal operating conditions and may therefore only apply remediation actions that are directly related with observed abnormal operating conditions.

Yet other variant embodiments may identify and group activities performed by the software delivery and operation management system that are caused by a triggering event, like the availability of a new version of a software component, or the observation of an undesired operating condition. The grouped activities may include all delivery and remediation activities that were performed in reaction of the received triggering event.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of the abstraction layers that form the proposed automated software delivery and operation management system.

FIG. 2 shows an exemplary architecture for an automated software delivery and operation management system.

FIGS. 3*a*-3*d* depict configuration records that may be used to define portions of the automation system.

FIG. 4 shows an exemplary sequence of steps performed by the automation system to realize the delivery of a software component.

FIG. 5 describes an exemplary remediation sequence that is performed on an identified undesired operating condition.

FIGS. 6*a*-6*b* provide flow charts that conceptually describe delivery and operation automation processes.

FIGS. 7*a*-7*c* show flow charts of processes that are related to the maintenance of a delivery and operation automation system.

Corresponding reference numerals indicate corresponding parts throughout the several views of the drawings.

DETAILED DESCRIPTION

Example embodiments will now be described more fully with reference to the accompanying drawings.

Automation of software delivery and software operation management processes are nowadays key for software vendors to support the fast provision of new features, updates, or bug fixes. The delivered software products themselves a designed in a way that supports this agility by decomposing them in small, independent and loosely coupled services that cooperate to provide an overall application feature set and experience. Small size, independence narrow interfaces are the core design principles of those software components that enable their fast and frictionless adaptation and update.

However, those principles that are well known and lived in the world of software development, are not yet adapted to the tasks of delivering software components and managing their operation, e.g. in productive environments.

Software delivery pipelines are typically formed by conglomerates of tools from different vendors that are combined using vendor specific configuration tools and scripts. This creates a highly complex, tightly coupled structure that is difficult to maintain or to repair in case of failures. This creates a highly critical situation for software vendor organizations as the software delivery automation infrastructure is the basis for their promised agility. When an individual software component fails due to an error, or a new feature are required immediately due to changed customer behavior, fixes or updates can be delivered timely due to a working delivery automation system. However, when the delivery automation system itself fails, the whole delivery chain is broken and no fix or update for any component can be delivered until the pipeline is fixed. Therefore, design principles that support narrow interfaces, loose coupling and the independence of interacting components, that are well established in the software development process, are also required for the design of software delivery and software operation management automation systems.

Coming now to FIG. 1, which illustrates the main layers of abstraction that may be used to create an agile automation system as proposed herein. An automation target layer 103 represents e.g. application components 127 and their configuration 128 that are executed in an execution environment 125 to provide a desired application functionality. Example application components may contain but are not limited to individual services providing portions of the overall application functionality. Those application components may e.g. be implemented in form of container images created by application developers. Container images refers herein to self-contained software packages that are designed to be executed by an execution environment that provides operating-system level (or container based) virtualizations. Basically, the goal of containers is to provide operating system level virtualization for processes running in the containers. The operating system level virtualization encapsulates potentially conflicting processes from each other and builds the foundation for flexible execution environments 126 that may deploy, update, remove, reconfigure, connect and run containers based on machine readable configuration files or commands received via standardized APIs (application programmable interfaces). Examples for such execution environments include systems like Docker or Kubernetes.

Application configs 128 may contain but are not limited to configuration parameters specifying the resources that are provided to individual application components, like available main memory or percentage of overall CPU resources, application-level configuration parameters to e.g. specify how a specific application component provides requested services. Application configs may also specify how application components are interconnected, how traffic is routed between different application components and how application components may be replicated to cope with high request loads. The automation target layer may in addition contain monitoring components, like agents deployed to application components that monitor activities performed by those application components.

A concrete service layer 102 provides various types of vendor specific services that interact with the execution environment 126 to realize desired changes of application components 127 and or configuration 128 or to perform specific activities using the application components. Those services may include but are not limited to deployment services 119 which may add, remove, update or reconfigure application components, testing services 120 which perform specific testing sequences on application components, monitoring services 121 which may monitor the behavior of application components during test scenarios or live operation, validation services 122 which may analyze monitoring data corresponding to specific test situations to determine whether the monitoring data indicates a failed or a passed test outcome, remediation services 123, which may interact with an execution environment of a live operating system to mitigate or eliminate observed undesired conditions on the live operating system or notification services 124 which may be used to inform humans involved in development and operation of the application about observed events (e.g. finished deployment/test/verification activity, occurrence or correction of undesired operating condition). The services 119-124 may send requests 125 to the execution environment to perform various activities.

Typically, all those services 119-124 provide control and configuration interfaces that are capable to satisfy all requirements of a modern automation system for the delivery and operation management tasks. The services 119-124 depicted in FIG. 102 are of exemplary nature only and do not restrict the scope of the disclosed technologies. Those technologies may be applied to all types of services that are directed to the management of software components.

However, as all those services are typically provided by different vendors, their control and configuration interfaces typically vary to a great extend and it is a difficult task to configure and integrate all those tools and services to create software delivery and/or software operation management systems. Current state-of-the-art systems are typically implemented on the concrete service layer 102, where vendor specific tool configuration and interaction is integrated using glue-scripting code to create prototypic delivery and/or operation monitoring systems that just work for one specific automation task. Those systems tend to get more and more complicated over time and originally simple tasks like adding new steps to a delivery pipeline or exchanging a service vendor quickly become hard or even impossible. Such systems are so frequent, and the problems that arise from their maintenance are so well known that literature as coined a specific term for those systems. Such systems are called "snowflake" systems, as over time, every one of those systems becomes a unique, complex and, most problematic, not reproducible individual item. Consequently, a conceptual improvement is required to better cope with this complexity by introducing additional abstraction layers.

A service abstraction layer 101 may be introduced to hide the complexity and variability of vendor specific automation services and tools (119-124). This abstraction layer is formed by a set of abstract service descriptions 115, that identify and describe the various concrete automation services and tools in a vendor independent form. In addition, those abstract service descriptions contain data describing how corresponding concrete services may be invoked and how responses or results of those concrete services can be transformed into a vendor independent format. A service request handling module 117 receives requests 114 to invoke abstract services and uses the corresponding abstract service descriptions to translate the abstract service request into a concrete service request and then forward it to the respective concrete service. A service feedback handling module 130 may receive responses or results 129 for issued concrete service requests, either from concrete services (119-124) or elements of the automation target layer 103 and transform those results into a vendor independent format.

The service abstraction layer 101 provides means to group and exchange vendor specific services or tools that serve the same or a similar purpose.

A declarative layer 100 may finally use the service abstraction layer 101 to realize software delivery and operation management systems that are defined in declarative (i.e. by only specifying which tasks should be performed and leaving the concrete execution of those tasks to an execution layer) way instead of an imperative (i.e. specifying exactly which services should be used to fulfill the required tasks) on. The declarative layer 100 is formed by a set of declarative automation process definitions 111 that specify the sequence of tasks that should be performed and an automation execution module 113 that may interpret those automation process definitions 111 and translate them in sequences of implementation independent service requests. The automation execution module 113 may also receive feedback for issued service requests in form of abstract pass/fail result notifications for corresponding service requests from a service feedback handling unit 130.

Those pass/fail notifications may be used by the automation execution module 113 to decide whether a currently executed automation process should be continued or cancelled.

Typically, an automation process is started in response of a received automation sequence trigger event 110. Examples for such a trigger event 110 may contain but are not limited to events indicating a new version of an application component 127 or a change of an application configuration 128, or events indicating an unexpected condition in an operating environment. Based on type and other data describing the received trigger event 110, a corresponding automation process definition 111 may be chosen and executed by the automation execution module. The automation execution unit 113 interprets the selected automation process definition and issues corresponding service requests 114 for each process step contained in the selected automation definition 111. Those generic requests are received by the service handling module 117 and transformed into vendor specific requests 118 by the service request handling unit 117 using the abstract service descriptions corresponding to the receiver generic service requests 114. The vendor specific service requests are sent to the corresponding concrete service (119-124), which performs the requested activity on the execution environment and/or the application components and application configurations residing in the execution environment. After execution, either the services (119-124) or elements of the automation target (126-128) issue a corresponding service execution result 129, which may be received by a service feedback handling unit 130 and translated into a generic service execution result 131. The generic service execution result 131 may be received by the automation execution module 113. The automation execution unit 113 may continue executing steps of the currently selected automation definition 111 either until contained automation steps are executed or the first response indicating a failed automation step is received.

Referring now to FIG. 2, which provides an architectural block diagram of a computing system that may be used to implement a structured, declarative automation system for software delivery and operation management automation tasks. An automation workflow engine 210 may receive automation run trigger events 200 via a workflow control interface 211, fetch 216 an automation configuration 218 for the received trigger event from an automation config repository and then execute the fetched automation config. An automation typically consists in a sequence of step and condition 219 declarations that are sequentially executed by the automation workflow engine. An automation run status 212 describes the current status of an ongoing automation run.

An automation run trigger event 200 may contain but is not limited to a run identifier 202 which uniquely identifies a trigger event, and which may also be used to identify and tag all activities performed and event data received by the automation workflow engine that is related to the trigger event, a type 203 specifying the type of the trigger event which may determine whether the event indicates a software delivery or an undesired operating condition that requires remediation, and detail data 204 which contains data further describing the trigger event, like e.g. data describing new software versions or configuration changes or data describing an undesired operating condition.

An automation run status 212 may contain but is not limited to a run identifier 213 which identifies a specific automation run, a current state 212 which may be used to identify the currently executed step or condition 219 of an executed automation config 218, and an automation configuration reference 215 identifying the currently executed automation configuration 218.

During the execution of automation configurations 218, the automation workflow engine 210 may post service request events 224 to topics 222 of a service event bus 221. The service event bus 221 may be implemented as a topic based publish/subscribe messaging system, which provides multiples topics into which events may be published. Event consumers, like abstract services 230, may subscribe 223 to one or multiple of those topic channels to receive those messages.

An issued service request event 224 may contain but is not limited to a topic identifier which determines the topic to which the event is published, a run identifier 226, which identifies the current automation run (and should have a value that is identical to the run identifier 213 of the automation run status), an event identifier that identifiers the event, an optional service identifier which may be used to identify a specific service within the selected topic in case multiple services are registered for the topic to which the event is published and optional service specific data 229 containing additional that may be required to specify the service request described by the service request event.

Multiple abstract services 231 may be available in the automation system, each service may be subscribed 223 to at least one topic channel 222 of the service event bus. Notification services that may be used to e.g. inform users about the progress of automation runs may be subscribed to all topic channels.

An abstract service 230 may contain but is not limited to a service identifier 231, topic subscription data 232, specifying to which topics the service should be subscribed and concrete service interface data 233, which connects an abstract service 230 to its corresponding concrete service 236.

On receipt of a service request event 224, an abstract service 230, may optionally compare the received service identifier 228 with its own service identifier 231 to determine whether it is the intended recipient of the event. In case multiple service are subscribed to the same topic, all those services receive the same events. A matching service identifier 228/231 may be used to determine the one service which should handle the request event.

The receiving abstract service 230 may use the service specific data 229 and the concrete service interface data 233 to compose a concrete service request 234 which is sent to a concrete service 236. The concrete service may then execute the requested activity, like e.g. updating software components, triggering test runs or performing remediation actions. After the requested activity was performed, the concrete service 236 may send a concrete service response 235 to its corresponding abstract service 230. The abstract service 230 may translate the concrete service response into a service result event 237 and forward 241 it to the workflow control interface 211 of the automation workflow engine.

A service result event 237 may contain but is not limited to a run identifier 238, identifying the current automation run, an event identifier 239, identifying the current service result event and a pass/fail indicator, indicating success state of the requested service invocation.

On receipt of a service result event 237, the automation workflow engine 210 may use the run identifier 238 to identify the automation run to which the service result event belongs and select the automation run status 212 with a matching run identifier 213. In case the pass/fail indicator 240 of the received service result event 237 indicates a successful service indication, the automation run status may proceed to the next step/condition of the currently processing automation config, or in case no next step/condition is available, indicate a successful automation run. If otherwise the pass/fail indicator indicates a failed service invocation, the current automation run may be stopped, and a failed automation run may be indicated.

Coming now to a more concrete example of a declarative deployment stage and its translation into concrete service calls that perform actions on software components that should be deployed.

An exemplary declarative deployment stage "Dev" for the execution of functional tests, e.g. on a new version of a software component, may contain a first deployment step that defines how the software component should be installed and a second test step that defines the tests that should be executed and also the strategy that should be used to execute the tests. The deployment step may be noted in the pipeline declaration as "deployment strategy", followed by an identifier for the deployment strategy that should be used for the stage. In this example, the deployment strategy "direct" may be used, which indicates the replacement of the old version of the software component by the new software component in all instances of the target execution environment. Alternative strategies may include "canary" or "blue/green" which only upgrade a subset of instances to create a hybrid installation that operates both versions of the component concurrently to reduce upgrade risks. See below for more details of those deployment strategies.

The test strategy entry may be set to "functional", which indicates that only tests directed to testing the functionality of the software component should be executed. Other test strategies include a "performance" strategy, which performs tests directed to testing the performance of the software component.

In case a new version of the software component gets available, e.g. when it is uploaded to the component registry of the automation system (see e.g. FIG. 4, element 412 "component registry"), an execution of the deployment pipeline is triggered, which runs the "Dev" stage. The steps of stage "Dev" are executed in the order they are specified (i.e. first the deployment step and then the test step).

Execution of the first step "deployment" may first fetch the abstract service description for the deployment strategy "direct". Typically, the deployment automation system interacts with an automated execution orchestration system, like a Kubernetes cluster, which provides APIs to deploy software components in various ways. Such an environment may also provide means to manage a set of isolated execution environments, which may be selected as deployment targets. Kubernetes uses the "namespace" concept to define such isolated execution environments. A "namespace" "Dev" may be defined in the connected Kubernetes cluster, and the execution of the deployment step may use the name of the enclosing stage ("Dev") to select the target namespace. The selected "direct" strategy may be mapped to deployment commands that are sent to the Kubernetes cluster to update the software component in all instances running in the "Dev" namespace.

After successful execution of all concrete commands that were derived from the "deployment" step, the stage execution continues with the "testing" step. An abstract service description 115 for a test service fetched and interpreted to perform the testing. As an example, the abstract service description may map to a specific implementation of a test service, like an installation of a Jenkins test automation server. Such a test automation server provides various interfaces to specify test runs, including the selection of tests, the installation of test procedures in a specific environment ant the execution of those tests in the environment.

The fetched abstract service description may use the provided test strategy ("functional") to select the desired tests. This may either be performed by the deployment automation system by e.g. selecting those tests for the updated component that are labeled as "functional" and sending those tests to the test automations system, or by sending the complete test set and a filter criterion to the test automation server. Further, the name of the current stage ("Dev) may be used to specify the target system in which the test automation server should install and execute the tests. After installation and execution of the tests were performed successfully, the deployment pipeline may continue with the next step.

It is noteworthy that various types of configurations must be created and maintained to enable a seamless interaction of different deployment services, execution environments and notification mechanisms both to notify the automation system about the availability of new software component versions and to notify users of the automation system (e.g. developers or SRE engineers) about the status of ongoing deployment tasks. Those configurations are typically provided by different persons with different responsibility/roles and concerns.

Known deployment automation systems provide various means to configure all those tasks, but the do not consider separating concerns of different roles that are involved in the automation processes. This leads to large, not maintenance-friendly "spaghetti code" configurations of those build automation systems. Simple, small changes, like changing the vendor of a single deployment service become error-prone, risky and labor intensive because they require changes to those large and complex configuration files.

The disclosed system tries to overcome this problem by introducing different levels of configuration that considers and separates those different concerns. In addition, it enables to reuse configuration data.

A first role/concern that is involved in the setup of a deployment automation system is the operation engineer (OPS), which is responsible that all required automation tools (e.g. execution environments, test automation server, etc.) work properly and interact with the central automation system (automation hub, see element 400 in FIGS. 4-5). The operations engineer may provide configurations for abstract service descriptions, 115, which are used by the centralized delivery automation system with various delivery services. Each of those configurations may be provided in an independent configuration item/file, which may be changed independently and also reused for different automation projects. This may also include the configuration of the centralized automation management system itself, and may e.g. define available automation steps (deployment strategy, test strategy) and their mapping to abstract service descriptions.

Another concern and corresponding configuration requirements come from the development view, which defines interacting software components that in cooperation provide application functionality. Configuration requirements from development include the registration of software components for automatic delivery and the definition of tests suites for those components that are directed to different test objectives (functional vs. performance). Developers may use a component registry that interacts with the automation management system to register their software components and corresponding test suites (see e.g. component registry 412 in FIG. 4).

System reliability engineers (SREs), which are responsible for the frictionless operation of the whole delivered application are reliable for the definition of the delivery pipeline, including e.g. various delivery stages and stage propagation requirements. This introduces a third concern and configuration requirement which is separately managed by the automation management system.

Different to prior solutions, those different configuration concerns/aspects are not intermingled to form not maintainable monolithic configuration body, the automation management system keeps those configuration aspects apart and only uses them in combination to fulfill automation tasks.

The configuration of the application, i.e. the software components forming the application and corresponding tests is independent from the definition of software delivery pipeline that is used to deliver updates for those software components. This makes it e.g. possible to completely change the delivery process by simply exchanging the configuration of the delivery pipeline. FIGS. 3*a* to 3*d* show some data records that may be used to specify automation sequences and automation steps. FIG. 3*a* shows a delivery automation config 300, which may be used to define automation processes for the delivery of software components. A delivery automation config may contain multiple delivery stage configs 301. Stage configs 301 may e.g. be defined for various types of tests like e.g. functional tests or performance tests and for various deployment strategies like canary deployments, red/green deployments or dark deployments.

Each stage config 301 may contain a preparation step, which may e.g. specify where new software components should be installed and how traffic should be routed to the new software components, a verification step 303 which may e.g. define a set of test procedures that should be executed on the new installed software components and a set of conditions that need to be fulfilled for a decision that the testing of the software components that were executed in this stage were successful and a promotion step 304 which defines the prerequisites to promote the automation run to the next stage in case the verification step was successful. Example promotion steps include automatic promotion, in which promotion to the next stage is automatically performed on a successful verification step and manual promotion, which requires an additional human confirmation for a promotion after a successful verification.

A verification config 310, as shown in FIG. 3*b* may be used to specify, in machine readable form, how multiple different test observations may be combined to create a single pass/fail indicator. A verification config 310 may contain but is not limited to a parameter selection 311 which defines the observation parameters that should be considered, like response times, error rates or resource usage data, parameter condition definitions 312, like thresholds for expected, tolerable and intolerable value ranges, parameter verification result aggregation data 313 which may assign each threshold value range a specific numeric value and aggregation result pass/fail mapping data 314 which may be used to assign each parameter a specific weight and to define an aggregation strategy to aggregate the weighted threshold violation states of the observed parameters into a pass/fail indicator.

Automation configuration data records for remediation actions are shown in FIG. 3*c*. A remediation automation config 320 may contain but is not limited to a set of service level objective (SLO) violation criteria, like e.g. threshold values for error rate or response time measurement parameters, and a direct remediation action specification. A remediation action may specify an activity that should be performed on an observed SLO violation. As an example, SLO violation indicating an error rate of a specific component that is above a threshold may be combined with a direct remediation action that changes the processing performed by the component to an alternative, less error-prone variant. In case the SLO violation is observed, the automation system may automatically apply the direct remediation action on the component on which the SLO violation was observed.

FIG. 3*d* shows a counter measure config 330 which may be used by an automation system that operates in conjunction with a monitoring system that is capable to perform a causal analysis of observed abnormal operating conditions. Similar to remediation automation configs 321, counter measure configs 330 contain a definition for an unexpected operating condition (i.e. high error rate/response time, high resource usage etc.), and a corresponding (indirect) remediation action. The difference between remediation automation configs and counter measure configs is that the criteria for a counter measure config is not necessarily a SLO violation that automatically triggers a remediation activity. An unexpected condition criterion 331 of a counter measure config may be observed, but the corresponding remediation action 332 may not be executed. Only if a monitoring system that is capable to identify causal dependencies has identified a chain of causally dependent abnormal operating conditions that contain an abnormal operating condition that is also a SLO violation which requires automatic remediation, unexpected operating criteria of components that are also in the causal chain and are identified as causes for the SLO violation may be selected, corresponding counter measures may be fetched and the indirect remediation actions 332 of those counter measures may be applied. As a result, the remediation actions are not applied to the symptom (observed SLO violation) of the problem, but to its root cause.

Coming now to FIG. 4 which illustrates an exemplary step of an automated software delivery run.

Precondition for the automation execution is an automation process configuration 401, e.g. in form of a delivery automation configuration 300. Typically, the automation process configuration is provided 461 by a site reliability engineer (SRE), which is responsible for the quality and reliability of the created application and the services it delivers. The SRE selects the test steps and test configurations that should be executed to confirm that a delivery meets all quality standards. The structured automation system proposed here allows the SRE to specify those steps on an abstract, declarative level. This hides the complexities of used tools and environments from the SRE and allows the SRE to focus on its core tasks, to specify test steps and configurations that assure the desired quality of a software delivery.

A developer 410 may create a new version of a software component on its isolated development environment. After the developer decides that the new version of the component is ready for delivery, the developer may post 411 an update of the software component to a component registry 412. The company registry 412 may use a service interface 413 to create an automation trigger run event 200 that indicates 414 the update of the software component. An automation hub 400, receives the update event and forwards it to its automation workflow engine 210. The automation workflow engine may analyze the received event and then fetch a corresponding automation process configuration 401. Various types and variants of software component updates are possible, and each of those types and variants may have its own delivery automation configuration. The automation workflow engine may analyze the data received with the update event 414 to determine the appropriate automation process configuration.

The automation workflow engine 210 may execute the selected automation process configuration 401 by sending requests to execute abstract services to a service event bus 221 and receive results of those service executions that may be used to determine whether the current automation run should be continued or terminated.

The first step of the current automation process config may indicate to apply the current component update to a configuration management system 447 that tracks changes and updates of the management application. The automation workflow engine may send a corresponding event to a topic channel dedicated to config update events. A service interface 448 of the configuration management system may be subscribed to configuration update event channel and therefore receive 449 the sent event, add the component update to the configuration data of the application and send a service result event indicating a successful service execution. The automation workflow engine may receive this result event and proceed to the next step, which specifies that the current version of the application (which contains the updated software component) should be fetched 450 from the configuration management system 447. After the configuration management system indicates to the automation workflow engine that the process of fetching the current application version was successful, the automation workflow engine 210 may issue an event 420 indicating the deployment of the new version to a deployment management system 421. The communication with the deployment management system is also performed via a service interface 421 which is capable to receive abstract, generic service events and to translate them into commands that are appropriate for the deployment management system 422. The deployment management system 422 may execute the deployment requests in an execution environment 428 that may host various components 429 430 of the application. The execution environment may be capable to route traffic between those components and may also execute and manage multiple instances of specific component types, like e.g. two instances of component 429 and 430.

An automation process config may be provided in form of a delivery automation configuration record 300 and contain multiple stage configurations 301. The deployment management system 422 may create separate execution environments 428 for different stages to assure that there are no undesired interdependencies between the tests performed in different stages.

The deployment management system may signal a successful deployment back to the automation hub via it service interface 421, and the automation workflow engine 210 may proceed to the next automation step. The next automation step 432 may configure a monitoring provider 436, to monitor the execution environment 428 and the components 429 deployed to it, which were created and deployed in the previous automation step.

Setting up the monitoring configuration may contain but is not limited to injecting monitoring agents into application components 429 and 430 and configuring the monitoring data that those agents should provide. The generated monitoring data 431 may contain but is not limited to scalar monitoring data describing e.g. the resource utilization of different application components, transaction trace data describing transactions performed by one or multiple application components and topology data describing the connection and resource sharing topology of the application components. Connection topology data may contain data describing requests received by application components from external entities and corresponding responses, as well as communication activities between different application components. Resource sharing topology data may specify which components are executed by the same execution environment entity, like a process or a container. After monitoring setup is finished and the monitoring provider 436 reported the successful setup back to the automation hub 400 via its service interface 433, the automation workflow engine may advance to the next automation step and send an event 424 requesting the execution of tests on the previously created execution environment 428 the service interface 425 of a test management system 426. The service interface 433 may translate vendor independent monitoring configuration received from the automation hub into vendor specific monitoring configuration data appropriate for the specific monitoring provider 436.

The test management system 426 may execute the requested test sequence on the execution environment 428, and the application components 429 and 430 of the application may create monitoring data 431 that describes the behavior of the components during the test runs.

The monitoring data may be received by a monitoring provider 436 and stored in a topology model 437 of the application, a transaction repository 438 transaction trace data describing transactions executed by the application components and in an infrastructure measurement data repository 439 containing measurement time series of performance, functional and resource utilization parameters of the application components. The monitoring data provider may combine 440 those monitoring data categories to create an integrated model 441 of the monitored application and its behavior. This integrated model may then be used by a causation module 444 to first identify unexpected operating conditions that occurred during test executions, and in case multiple unexpected operating conditions did occur, to identify causal relationships between those unexpected operating conditions and to further identify those unexpected operating conditions that are the root cause for other unexpected operating conditions that occurred contemporaneously.

The causation module 444 may work according to the teachings of U.S. Pat. No. 10,083,073 "Method and System for Real-Time Causality and Root Cause Determination of Transaction and Infrastructure related Events provided by Multiple, Heterogeneous Agents" and U.S. patent application Ser. No. 16/519,428 "Method And System For Automatic Real-Time Causality Analysis Of End User Impacting System Anomalies Using Causality Rules And Topological Understanding Of The System To Effectively Filter Relevant Monitoring Data", both by Moser et al., which are both incorporated herein by reference in their entirety.

After the test management system 426 finished the execution of the requested test sequences, it may notify a successful test execution back to the automation hub 400 via its service interface 424.

In response to the receipt of a success notification from the test management system the automation workflow engine 210 may proceed to the next step and fetch 434 monitoring data describing the behavior of the application components during the test execution from the monitoring provider. This step may in addition fetch test result data for the previously executed test sequence from the test management system 426, like the number of failed and succeeded tests, the names of failed test or detail failure description data for failed tests.

The successful provision of the test observation data by monitoring provider 436 and/or test management system 426 may be reported back to the automation hub via respective service interfaces 425/435, and the automation workflow engine may in response proceed to the next automation step, which consists in the evaluation 455 of the received test observation data to determine whether the test sequences executed on the application where successful. Verification configuration rules 310 may be used to combine and aggregate various types and instances of test observation data, originating either from the test management system 426 or the monitoring provider 436, to derive a single promotion/rollback decision result.

After the test data evaluation is finished, the automation workflow engine 240 may send a request 451 to the service interface 448 of the configuration management system 477. Depending on the result of the test data evaluation, the request may either command the configuration management system to finally apply the received update 411 and the continue to the next stage of the automation process in case the test data evaluation indicated a successful execution of the test sequence, or it may request a rollback of the update in case the test evaluation indicated a failed test sequence. In case of a failed test sequence also the current automation run may be cancelled.

All messages sent and received by the automation hub may also be forwarded to a service interface 453 of a notification tool 454 that sends notifications about performed activities and their outcome the developer 410 that provided the component update 411. Those notifications may be used by the developer to analyze and fix problems that occurred during the automation steps.

An automation operation engineer (OPS) 445 may, e.g. during maintenance periods, when no automation runs are executed, perform maintenance tasks on the tools and services used by the automation hub, like the component registry 412, notification tool 454, configuration management 447, deployment management 422, test management system 426 and monitoring provider 436.

As the automation hub 400 communicates with those concrete services and tools via their (abstract) service interfaces 413 which hide the specifics of their specifics from the automation hub, such maintenances are, in most cases, transparent to the automation hub and require no changes to any automation process configuration.

In addition, the OPS engineer may also define mappings from automation steps defined in automation process configs to corresponding events or messages to abstract services to that implement the automation steps.

An automated application operation management and remediation system that is based on herein disclosed concepts is shown in FIG. 5.

SRE engineers 460 and developers 410 may cooperate to setup and configure the automation system. The role of the SRE is to specify the overall requirements for the system in a formal, machine readable way, e.g. by specifying service level indicators (SLIs, i.e. key parameters that need to be observed) and service level objectives (SLOs, i.e. expected values or value ranges for the identified SLIs). Development engineers, which develop application components and may provide updates for those components, may provide remediation strategies for those components that may be used to react unexpected or undesired operating conditions. Those remediation strategies may be provided in form of remediation automation configurations 320 or counter measure configurations 330 and may contain a section that defines a specific undesired/unexpected operating condition (e.g. 321 SLO violation criteria or 331 unexpected condition criteria) and a section that specifies activities to remediate those undesired operating conditions (e.g. direct remediation action 322 or indirect remediation action 332).

The defined remediation strategies may then be stored in the remediation action registry 506 of the automation hub 400.

It is noteworthy that the same automation components, and also similar configuration concepts that are used to manage the delivery of software components to a production environment may also be used to observe the functionality of the software component in the production environment and to automatically apply remediation actions if required. Therefore, an automation workflow engine, together with a service event bus and an automation process configuration 401 may play the role of a delivery automation system for a new and to be delivered software component. The same workflow engine and service event bus may, together with a remediation action registry 506 play the role of a remediation management system when the software component was delivered and an automated management of its operation in a production environment is required. Therefore, an automation hub 400 may be both referred to as delivery automation system and as automated remediation or operation management system.

After the remediation strategies provide by SRE 460 and DEV 410 engineers in form of remediation automation configurations 320 and counter measure configurations 330 are stored in the remediation action registry 506, a monitoring provider system 436 may be configured to perform monitoring of a production execution environment 428 that hosts the components 429 and 430 of the managed application. The execution environment may operate the managed application which serves real user requests and the components 429 and 430 of the application may continuously create monitoring data describing their performance and functionality related behavior. The monitoring data 431 may be generated by agents (not shown) deployed to the application components and contain transaction tracing, topological and scalar resource consumption measurement data. The monitoring data may be received, combined, and analyzed by the monitoring provider 436 as described before to identify unexpected operating conditions and, in case of multiple identified unexpected operating conditions, to identify causal relationships between those unexpected operating conditions.

The monitoring provider 436 may continuously receive and analyze monitoring data 431, and on the identification of unexpected operating conditions send a notification 509 describing those unexpected operating condition to the automation hub via a service interface 508. The data describing the unexpected operating conditions may also contain causation information describing causal dependencies between identified abnormal operating conditions. The service interface 508 may translate transferred notification data from a vendor specific form into a form that is independent from individual monitoring provider implementations to support an easy exchange of the used monitoring solution.

The automation workflow engine 210 may analyze the received anomaly notification and query 507 those remediation automation configurations 320 from the remediation action registry with SLO violation criteria 321 that describe violation scenarios that were observed and are thus also described in the anomaly notification. In case the anomaly notification contains no causation data, the direct remediation actions 322 of the fetched remediation automation configurations 320 may be applied by the automation workflow engine 210 by sending 510 corresponding vendor independent instructions to apply them to a service interface 511 of a deployment management system 512. The service interface 511 may translate those instructions into a vendor specific format that can be processed by the deployment management system 512. The deployment management system 512 applies the remediation actions (i.e. changes of component configurations, changes to the traffic routing between components or changes to component cluster sizes to adapt to changed load situations) to the execution environment 429 and/or the application components 429/430 executing in the execution environment.

Service interfaces 413, 421, 425, 433, 435, 448, 453, 508 and 511 represent the interfaces that are used by the automation hub 400 to interact with other components to perform automation tasks. To reduce the complexity of the automation hub and to support frictionless exchange of those components, it is important that terms, command formats etc. of those external components are separated from terms and command formats that are used internally by the automation hub. Therefore, those service interfaces provide a mapping between the internal terminology and formats of the automation hub and the vendor specific terminologies and formats of those external components. In a simple example, a service interface may be component that receives e.g. a request in the internal automation hub format, translates it into a corresponding request for a connected external component and then forwards it to the external components. Service interfaces may also map from external, vendor specific terminology to the automation hub internal form.

As an example, service interface 508 may map vendor specific monitoring notifications that indicate erroneous behavior like unexpected crash of processes or host computing systems, or the occurrence of memory exhaustion events (i.e. out of memory exceptions), from vendor specific terminology to vendor independent terminology used by the automation management system. As an example, a monitoring provider may, on occurrence of an exceptional situation, detailed trace data that may e.g. help a developer to fix the code that caused the exceptional situation, like a call stack describing the exact code location of the exception and call context data. This information is not required by the automation system and service interface 508 may in this case strip available trace data and only transfer data identifying the type of observed exceptional situation, like e.g. "Out of memory", "process crash" or "host system crash", together with data identifying the component on which the unexpected event occurred. In case the anomaly notification contains causation data and the anomaly situation matches at least one SLO violation situation of a remediation automation config 320, the automation workflow engine 210 may analyze the provided causation data to identify the anomaly that represents the root cause of the observed SLO violations. The received causation data is typically provided in form of a directed graph, where the nodes of the graph describe observed abnormal conditions, and the directed edged between those nodes describe causal relationships between those nodes. A subset of those nodes may have been identified by the causation module 444 of the monitoring provider 436 as abnormal conditions that caused all or most of the other abnormal condition in the causality graph. Those nodes may be marked as root cause nodes. The analysis that the workflow engine performs on the received causation data graph may first identify abnormal conditions that indicate the violation of a SLO. If such abnormal conditions are found, the causality graph may be traversed against causality direction (from cause to effect), until nodes are identified that are marked as root cause nodes. After such root cause nodes for SLO violations were identified, the workflow engine may query the remediation action registry 506 for a counter measure config 330 with unexpected condition criteria 331 that matches the anomaly that represents the root cause of the observed SLO violation. In case a remediation action config 320 or counter measure config that matches the root-cause anomaly is found, the automation workflow engine 210 may apply 510 the corresponding remediation action 322/332 to the deployment management system 512.

The application of the remediation actions changes the behavior and the capabilities of the application components 429/430 and their hosting execution environment in a way that the previously observed abnormal and undesired operating conditions (e.g. higher than expected error rate, response times or resource utilizations) that led the application of the remediation actions no longer occur. Monitoring data 431 that was recorded after the remediation actions were applied no longer shows those abnormal and undesired operating conditions.

The benefits of the proposed technology are best demonstrated by example. Consider a small e-commerce application consisting in a catalogue service, a shopping cart service, and a checkout service. Those services may be provided by development in form of individual software containers.

SRE engineers may use a delivery automation configuration 300 to specify a delivery pipeline that defines testing stages that a new software version needs to undergo before it is considered ready for productive use. In the current example, those stages may contain a functional testing stage, in which the functionality of the new version is tested, a performance testing stage, in which the performance of the new version is analyzed, and a gradual deployment stage, like a blue/green deployment or a canary deployment in which the behavior of the new application is tested in the operative environment and with real customer request but with an option to roll back to the previous version in case the new version behaves in an unexpected way.

In a blue/green deployment, the new version of the application may be installed in the operative execution environment in parallel to the current version. After installation, some basic test sequences may be performed on the new version and if those tests are successful, user traffic may be switched from the current version to the new version. The current version stays installed next to the new version, but after the traffic switch it no more receives user requests. The new version may be intensively observed for a specific period of time to determine whether any unexpected events occur. In case of unexpected events, traffic may be switched back to the old version. Otherwise, the old version may be removed.

In a canary deployment, also old and new version are installed side-by-side and basic tests may be executed on the new version before any user traffic is routed to it. Different to the blue/green deployment strategy, in a canary deployment, only a portion of the user traffic is routed to the new version. Old and new version operate in parallel for a specific time period, where the old version typically still handles the majority of the user traffic. Also like in a blue/green deployment, the behavior of the new version is observed for a certain period of time until it is decided whether the new version is capable to replace the old one and all traffic is routed to it. Other deployment scenarios that e.g. perform a gradual update of software components in case e.g. a software component run in a cluster that executes multiple instances of the component, or that e.g. perform a gradual transition of traffic from an old version to a new one.

In the current example, SRE may decide that a blue/green deployment strategy is appropriate for this application and create a delivery automation config 300 containing three stage configurations 301 for the three pipeline stages. The first functional testing stage may be named "Dev" and may contain a preparation step 302 specifying direct deployment, a verification step specifying the execution and evaluation of functional test and a promotion step indicating automatic promotion. The second, performance testing stage may be called "Perf". This second stage may also contain a direct deployment step and an automated promotion step. The verification step of the "Perf" stage may specify the execution and evaluation of performance test suites.

The third "Prod" stage may contain a deployment step that specifies a blue/green deployment. The verification step of this stage may contain parameters that describe a duration until which the new "green" deployment should be monitored until it is considered as working as expected and a set of definitions of abnormal operating conditions that may cause a rejection of the "green" deployment when they occur during the observation period.

The promotion step of the "Prod" stage may indicate manual promotion. The promotion of the "Prod" stage may cause the automation system to delete the now obsolete "blue" deployment from the productive execution environment. The currently new version that is installed in the productive environment will act as "blue" deployment for the next update.

Either SRE or development engineers may register the project and its three components with the automation system and link it with the automation configuration 300.

The project structure and the connection of the project with the automation configuration may either be stored in an internal configuration storage of the automation hub 400, or in the configuration management system 447. In both cases, the automation hub 400 may access the project structure and its associated automation configuration for the automated delivery or remediation processing, to e.g. create events to communicate with various delivery pipeline or monitoring tools. With the registration of the application and its components, the definition of the automation configuration and the assignment of the application to the automation configuration, the automation system is set up and ready to execute automated delivery tasks. It is assumed that all delivery tools are already installed, configured, and integrated with the automation system. Abstract service definitions 230 may be used for the integration of those tools with the automation system.

Test sequences for e.g. functional and performance tests for the application are also provided, either by development or site reliability engineers.

After project structure and delivery automation configuration are available at the automation system, development engineers may provide a first version of the three components and register them in the component registry. The components may e.g. be provided in form of container images that provide the desired functionality. The registration of the initial container versions is notified to the automation system, e.g. in form of update events 414 that are sent from the service interface 413 of the component interface. The update events contain data that identifies the components that were updated and the application to which they belong. The automation system fetches the automation configuration for the application and starts to execute the steps of the automation config.

As mentioned earlier, the first step of the automation config is the preparation step for a "Dev" environment. Execution of this first step causes the sending of events that apply the update to the configuration management system 447 of the automation system. Those events may contain data identifying the updated components, the version of the components, the application to which the components belong and the stage (e.g. in this case "Prod") for which the preparation is performed. The events are received by the configuration management system 447, which may use the data contained in the events to fetch identified components from the component registry, create a configuration segment (e.g. a branch), that is identified by the application, the version of the components and the automation stage (e.g. "Dev"). A conventional configuration management system, like e.g. a Git configuration management system, which is also used for configuration and version management in software development may be used. Such configuration management systems use "version branches" to manage different, parallel versions of a software product. The automation system may e.g. use this branching system to create a branch for the "Dev" stage and store the current versions of the application component in this branch. The identification data of the branch may in addition contain the current version of the application. After the branch was created and the application version and its current components are stored in the configuration management system, an event indicating the successful storage is sent back to the automation hub 400, which may send an event that requests the deployment of the current version to the deployment management system 422.

The deployment event may contain data describing the application and the components, including the desired version, that should be deployed, and also information about the delivery stage for which the deployment should (e.g. "Dev", "Perf" or "Prod") be performed and the type of deployment that is desired, like e.g. direct, blue/green or canary. The deployment management system receives the event, fetches the versions of the application components that should be deployed, generates an isolated execution environment 428 for the current stage and deploys the fetched components to the execution environment. A container execution and orchestration system like Kubernetes may be used as deployment management system 422. Kubernetes provides a "namespace" concept that supports the creation of isolated execution environments. This "namespace" concept may be used to generate e.g. different execution environments for deployment stages.

A service interface 421 may receive a deployment event and translate it into an imperative request that can be processed by the Kubernetes system. For the translation of the deployment event into a corresponding, Kubernetes-specific request, the service interface may use mappings defined in concrete service interface data 233 of an abstract service record 231 that represents a deployment system. The mapping data may e.g. include an URL that identifies an automation interface of a specific Kubernetes installation together with credential data, like username and password required to access the Kubernetes system. The service interface 421 may use this mapping data to create a service request appropriate for the Kubernetes system that corresponds to the received deployment system. The service interface may e.g. combine data describing the desired changed indicated by the received event, like e.g. the deployment of a specific version of an application or an application component to a specific namespace, with data that is specific to an individual Kubernetes instance on which these changes should be applied to create a corresponding concrete service request.

A successful creation of the execution environment 428 and deployment of the application components 429 and 430 to the execution environment is notified back to the automation hub, which in response sends out events 432 to configure monitoring of the application just deployed to the execution environment deployed to the currently executed delivery stage. The sent event may contain data identifying the application and the components that need to be monitored, the name of the currently executed delivery stage (which may be used to identify the corresponding execution environment), and the type of deployment for the stage. The event may be received by a monitoring provider, which on receipt prepares monitoring of the execution environment, like e.g. adapting monitoring configurations and placing monitoring agents in the execution environment and/or the deployed components. After the monitoring configuration is finished, the monitoring provider sends a corresponding event back to the automation hub.

Setting up the monitoring provider concludes the preparation step 302, and the automation hub proceeds with the execution of the verification step of the "Dev" stage. An event indicating a verification request is sent by the automation hub which is received by a test management system 426. The event may contain data identifying the version of the application and its components that should be tested, information about the type of testing that should be performed (e.g. functional or performance), and about the delivery stage (e.g. "Dev", "Perf" or "Prod") for which the testing should be performed.

The event is received by a test management tool 426, which used the information contained in the event to determine a set of tests that should be executed. Dev and/or SRE engineers may define various tests covering functional or performance related aspects of the application and group them according to their type (e.g. functional or performance) and their delivery stage relevance. Tags may be assigned to individual tests and the test management system may on receipt of an event compare those tags with the data contained in the event to identify the tests that should be executed.

The test management system triggers the execution of the test selected tests in the execution environment 428 corresponding to the delivery stage information contained in the received event. The execution of the tests generates both direct test result data that may e.g. be stored by the test management system for later retrieval, and monitoring data 431 e.g. acquired by monitoring agents deployed to the execution environment and components executing therein. The monitoring data may be transferred to and stored by a monitoring provider for later analysis.

After the test execution is finished, the test management system 426 sends an event indicating the successful execution of the selected tests to the automation hub 400.

On receipt of the event indicating successful test execution, the automation hub 400 sends an event indicating a request for test result data. This event may contain data identifying the version of the application on which the tests were performed, identifying the delivery stage for which the tests were performed, information about the type of the performed tests (e.g. functional or performance), and data about the time interval in which the tests were performed.

The test result request event is received by the test management system 426 and the monitoring provider 436. The test management system uses the data received by the event to identify test runs and corresponding test results. An event containing the identified test results is sent back to the automation hub. The monitoring provider may use the data in the received event to identify monitoring data that was fetched from the components involved in the test executions and send this monitoring data back to the automation hub. Both test management system and monitoring provider may use data about the stage on which the tests were performed, the time of the tests and the type of tests (functional or performance) to identify test related data.

The automation hub 400 may on receipt of the events perform an evaluation 455 of the received test data. This evaluation may be based on verification configurations 310, which specify how individual test results are combined and graded to get to a decision whether the test results indicate that the currently tested software version is fit for the next stage.

Based on the outcome of the test data evaluation, the automation hub may either proceed to the promotion step 304 of the task, in case the evaluation indicated a successful testing phase, or may rollback the current delivery candidate in case of the testing phase failed.

For a negative evaluation result, the automation hub may send a corresponding event to the configuration management system which in turn removes the configuration branch of the currently executed stage and all configuration branches for previous stages of the current delivery, as the failed test evaluation indicated that the current delivery candidate is not fit for its intended purpose.

All events sent and received by the automation hub 400 are also received by a notification tool 454, which transforms those events into notifications that may be received by responsible development and SRE engineers. Especially notifications indicating failed deliveries are of high importance as they indicate that manual actions need to be taken by development or SRE engineering personnel to fix the failed delivery.

In the current example, the "Dev" stage testing may be successful, and the automation hub proceeds to the promotion step of the "Dev" stage. Promotion of the "Dev" stage may be automatic, which means that after a successful "Dev" stage execution, the next stage, which is in the current example the "Perf" stage, will be executed.

The sequence of events and the activities performed in the "Perf" stage are similar to those of the "Dev" stage. The only difference is that in the "Perf" stage, the testing emphasis may lie on performance tests, and more test related monitoring data provided by the monitoring provider 436 may be used for the test evaluation. In addition, the promotion step of the "Perf" stage may be manual, as the "Perf" stage is the last stage before the production stage. A manual promotion requires human confirmation that the delivery is fit for the next stage, even if the testing for the current stage was successful.

For the current example it may be assumed that both the test for the "Perf" phase were successful and that also the result of the final manual check indicated a delivery that is fit for the production stage.

The result of manual promotion check may e.g. be entered to the automation hub using a graphic user interface.

On receipt of the positive promotion decision, the automation hub may proceed to the "Prod" stage. The "Prod" stage differs from the previous stages as it delivers the new delivery into an execution environment 428 in which a previous version of the software is already running and serving real customer requests.

In the current example, a blue/green deployment is configured for the "Prod" stage, which first installs the new delivery in parallel to an existing version that is currently running in real operation and handling real customer requests.

The new delivery is installed in the operative execution environment, but user traffic is still routed and processed by the old version. After the new delivery is installed in the operative environment, a set of final tests may be performed on it. Those final tests are of great importance, as they test the new version in the final operative environment. Those tests may reveal problems that are related to the operative environment, which could not be detected during testing performed in previous stages, as they were executed in different execution environments that may deviate from the operative execution environment.

After a successful final test, routing of the user traffic may be changed to be received by the new version of the software. The old version may remain in the operative execution environment for a certain time as a backup in case unexpected conditions occur with the new version. In this case, traffic may be routed back to the old version. In case no issues occurred in the new version, the old version may be removed from the operative execution environment.

The automated delivery into the production stage is similar to the automated delivery to previous stages, except that no new execution environment is created, but the new delivery is installed in an existing execution environment, alongside an already installed version of the software that is currently handling user requests. Test execution and evaluation are identical as they are performed in previous stages. In case the test phase fails, the new version is removed from the operative execution environment.

On a successful test phase, the traffic routing is changed, and user requests are further handled by the new application version.

The automation hub may send events for the deployment of the new version in the operative execution environment and for the execution and evaluation of tests the same way as it was performed for previous stages.

After the automation hub receives an event indicating a successful test sequence, it sends an event to the operative execution environment that triggers the change of the traffic routing to the new application version. This event may e.g. be processed by a load balancer operating in the execution environment. Typically, old and new version of the application have similar communication endpoints to which user requests are routed, and a switch from a communication endpoint of an old version to its corresponding endpoint in a new application typically needs no additional information, except that a switch from the old version to the new version is desired.

Before or after the traffic routing switch was performed, the automation hub may send events to the monitoring provider to configure monitoring the new deployed application version. The monitoring configuration may provide monitoring data describing the behavior of the new software version while it is handling real user requests. This monitoring data may be used to determine whether unexpected/undesired conditions occur during operation of the new software version. The monitoring data may be provided in different qualities, ranging from log data over time series metric data, transaction trace data, data describing individual identified abnormal operating conditions to graphs of identified causally related identified abnormal operating conditions.

After the traffic routing is switched and monitoring is enabled, the automation hub initiates continuous analysis of monitoring data to identify abnormal operating conditions.

In case no abnormal operating conditions are detected for a certain time, the new application version is considered stable, and the automation hub may switch to the promotion step of the production stage. For the final production deployment, the promotion step causes no new deployment in a new stage, as production is the final stage. The promotion step of the deployment stage may remove the old version of the software version form the operative execution environment. As this step removes the old "backup" version of the software that still could be used until then to switch back in case of unexpected problems with the new version, the promotion step may also require a manual confirmation.

In the current example it may be assumed that the new software version also passed the blue/green deployment stage. This new version now serves user request until a next new version passes all delivery steps and replaces it.

During this time, the automation hub 400 operates in remediation mode (see FIG. 5), and in cooperation with the monitoring provider, continuously monitors the application deployed to the operative execution environment to identify abnormal operating conditions. In case abnormal operating conditions are identified, the automation hub may perform an analysis of the abnormal operating condition and select a corresponding remediation action 320/330. The automation hub may send an event to the deployment management 512 to apply the remediation action.

The remediation action may be parameterized with a value extracted from the observed abnormal operating condition. As an example, if the number of requests handled by a specific service exceeds its capacity, the remediation action may specify to spawn new instances of the specific service to distribute the load over more instances. The degree to which the load exceeded the original capacity may be used to determine the number of new service instances to spawn, or the amount resources (CPU, memory) that those new instances get assigned. As an example, if the current load exceeds the expected load only by a small number, like 10-20%, only the amount of resources provided to the service instances may be increased, but the number of service instances may remain the same. Those resource may be increased proportional to the observed load exceed. For a medium load exceed, like 20-80%, new service instances may be spawned, where the relative number of new services is proportional to the observed exceed (e.g. currently 10 instances running and exceed is 80%, start 8 new services, vs. currently 50 instances running and exceed is 80%, start 40 new instances). For a high exceed (e.g. above 80%), both the number of instances and resources per instance may be increased.

It should be noted that a remediation action may consist of multiple steps or activities. As an example, the only remediation action currently known for a specific memory problem may be to simply restart the affected problem. A remediation action may first trigger a memory dump of the affected process to gain more information about the occurred problem and only restart the process after the memory dump data is stored. The goal is to get better insights into the root cause of the problem to either provide more specific and more effective remediation actions, or to proactively identify and apply countermeasures to avoid future occurrences of the problem.

In addition, data describing the history and frequency of observed service level objective violations may be used to determine an appropriate remediation action. As an example, for a SLO violation indicating insufficient disk space on a computing system, the time since the last SLO violation of the same type for this computing system may be determined and used to select an appropriate remediation action. In case the current insufficient disk space situation is the first one that was observed, or the duration between the current and the last occurrence of such a violation is above a certain threshold, an automated remediation, like a disk-compaction may be selected. In case it is observed that this problem occurs frequently, another remediation action, like notifying a human operator may be chosen instead or in addition.

Coming now to FIGS. 6*a* and 6*b*, which provide flow charts of processes related to software automated software delivery and automated software operation management.

A conceptual process for automated software delivery is described in FIG. 6*a* and the process starts with step 600, when a configuration change for delivery is received. The received configuration change may contain any change to one or more software components (i.e. change to the code of one or more components, change of component local configuration that changes the behavior of individual components or change of component global configuration that changes how components interact).

Following step 601 fetches the appropriate delivery automation configuration 300 for the received configuration change and then tries to fetch the first stage configuration 301 of the delivery automation configuration 300. Following decision step 602 checks whether a first/next stage configuration is available. In case a first/next stage is not available, step 603 is executed, which may indicate that the received configuration change is accepted and then may trigger the start of the operation monitoring of the received configuration change. The process then ends with step 601.

If otherwise a next stage configuration 301 is available in the delivery configuration 300, step 604 is executed, which performs the preparation/deployment step 302 defined in the currently processed stage configuration. The preparation/deployment step creates an application configuration that includes the received configuration changes and also prepares and configures other components, like a monitoring system 436, which are required for the execution of test sequences on the application configuration, the acquisition of test result data and the evaluation of the acquired test data.

Following decision step 605 analyses feedback data received from components involved in the preparation/deployment step to determine whether the deployment step was successful. The analyzed feedback data may contain but is not limited to data describing the achieved deployment state (e.g. managed application instance including received configuration change was successfully installed in an execution environment etc.) or success status of the monitoring configuration (i.e. number of successful/failed monitoring agent injections etc.). In case the deployment step was not successful, step 610 is executed which rejects the received configuration and the process afterwards ends with step 611.

If otherwise the deployment step was executed successfully, step 606 is executed which performs the verification step 303 of the currently executed stage configuration 301. During the verification step, various types of test sequences may be executed, including functional, performance or security/penetration tests. The results of the performed tests may be recorded as well as monitoring data describing various aspects of the behavior of application components during the test execution. Both test result data and test related monitoring data may be analyzed to determine a success status of the verification step. Verification configuration records 310 may be used to automatically aggregate test result and monitoring data into a decision whether the verification step was successful. Following decision step 607 analyzes the outcome of the verification step and continues with step 610 in case the verification was not successful and with step 608, which performs the promotion of the configuration change to the next delivery stage. The promotion may either be performed automatically, in which case the next stage is immediately started after a successful verification step, or it may require human interaction, in which e.g. a SRE engineer manually reviews the verification data to determine whether a promotion to the next stage is justified. Following decision step 609 analyzes the result of the promotion step and continues with step 610, which rejects the configuration change if it was decided that the configuration change should not be promoted to the next stage. In case promotion is accepted, the process continues with step 601 which fetches the next stage configuration 301.

Referring now to FIG. 6*b* which shows the flow chart of a process that manages an application in a productive operation environment by continuously monitoring the application and its component to detect undesired operating conditions, including those undesired operation conditions that represent violations of SLOs.

The process starts with step 610, when a configuration change passed the delivery pipeline and is deployed to a productive operating environment. In subsequent step 611, the remediation configuration (i.e. the remediation automation configurations 320 or counter measure configurations 330 stored in the remediation action registry 506 of the automation system that performs the automated management of the production application) may be manually adapted according to the requirements of the new deployed application configuration. In following step 612 the monitoring system and operation automation system continuously monitor the application to detect abnormal operating conditions that are also violations of SLOs.

In case of an SLO violation, decision step 613 continues the process with step 614, which fetches a remediation automation configuration 320 with a SLO violation criteria definition that matches the occurred SLO violation.

Following decision step 615 analyzes the monitoring data that describes the occurred SLO to determine whether causation data that identifies the root cause of the occurred SLO is available. Causation data may not be available if the monitoring system that is used to monitor the application is a conventional monitoring system that is not capable to provide causation data.

In case no causation data is available, the process continues with step 616 which applies the remediation action 322 of the remediation automation configuration fetched in step 614 to the managed application.

If otherwise causation data is available, the process continues with step 617 which analyzes the causation data to identify the root cause of the observed SLO violation. Causation data is typically provided in form of a directed graph, where nodes of the graph describe observed anomalies and the directed edges of the graph describe causal relationships between those anomalies. Determining a root cause for a SLO violation may be performed by first selecting the node of the causation graph that represents the SLO violation and then, starting from the selected node, traverse the causality edges of the graph against causality direction (from effect to cause), until either a node was reached was already marked as root cause by the causation module, or until a node was reached for which no edges pointing to causing anomalies exist. The so identified node may be considered as root cause for the SLO violation.

After the root cause was identified, step 617 may fetch a remediation configuration 320 or counter measure configuration 330 with a condition (i.e. SLO violation criteria 321 or unexpected condition criteria 331) that match the observations corresponding to the identified root cause. It is noteworthy there may be no counter measure config 330 with a matching unexpected condition criteria 331 available for a given identified root cause, but instead a remediation automation config 320 with a matching SLO violation criteria 321 may be available. In this case, the remediation automation config with matching SLO violation criteria may be used.

SLO violation criteria 321 and unexpected condition criteria 332 both describe conditions that indicate undesired/unexpected operating conditions. Examples may include a maximum failure rate, a maximum response time, a maximum CPU usage or a maximum memory usage. Those criteria may also contain filter data defining the components on which those criteria should be applied. These filters may e.g. be based on the type of component (service or application process) or the reachability of a component (e.g. externally reachable by customers vs. only reachable internally). Exemplary unexpected condition criteria may e.g. specify maximum CPU usage or memory usage for all monitored application processes and SLO violation criteria may specify a maximum response time for externally reachable services. The conceptual difference between SLO violation criteria and unexpected condition criteria is that the violation of a SLO violation criteria triggers the search and application of remediation activities to fix or at least counteract the observed violation (which may be performed by either applying a counter measure for the SLO violation itself, or by using causation data to find a root cause for the SLO violation and applying a counter measure for this root cause), whereas the violation of an unexpected condition criteria 331 alone does not trigger any further activities by the remediation manager.

In other words, monitoring data that only contains data violating unexpected condition criteria does not trigger any remediation action. Only monitoring data indicating an anomaly that represents a violation of SLO violation criteria triggers remediation activities by the remediation manager. This remediation activity may include analyzing causality data contained in monitoring data to identify another anomaly that was identified by the monitoring provider as root cause of the SLO violating anomaly. Counter measure configs with unexpected condition criteria matching this other anomaly may be fetched and their indirect remediation actions may be applied by the remediation manager.

Following step 618 may then apply the remediation action 322/332 of the remediation or counter measure configuration 320/330 fetched in step 617 to the managed application. More specifically, step 618 may use the provided monitoring data to identify the location (i.e. specific service or application process) on which the root cause anomaly was observed and then apply the remediation action on this location.

The process then continues with step 612.

A more concrete example for a remediation action may be based on a SLO specifying a maximum allowed failure rate for the execution of a specific service, and a remediation action specifying a counter measure for unexpected crashes of processes of a specific type (e.g. processes running a Java® virtual machine), that reads the configuration/command line of those processes and increases the memory assignment (e.g. value of "–Xmx" parameter for Java processes) by a certain percentage (e.g. 10%). A causating monitoring system may detect an undesired increase of the error rate of the specific service and trace the execution of those service calls.

Tracing data may reveal that the service requests are received by a front-end server process, which forwards the requests to a backend process. In addition, the causating monitoring system may have detected an increased frequency of crashes of those backend process, concurrently to the observed increased failure rate of the specific service. The causating monitoring system may also detect that the crashes of the backend server processes are caused by exhausted memory (Out of memory exceptions). The monitoring system may infer a causal relationship between increased failure rate, crashes of the backend process and memory exhaustion situation on the backend process, create monitoring data describing these findings and send it to the automation management system.

The automation management system may, on receipt of such monitoring data perform a first analysis step to determine the existence of a SLO violation (i.e. service failure rate higher than maximum failure rate specified by SLO), and in case a SLO violation is detected, continue analysis of the received monitoring data to detect a root-cause for the SLO violation. In the current example, this would reveal that the root-cause of the SLO violation are memory exhaustion events on a backend server. In a next step, the automation management system may query its remediation action registry 506 for a remediation action configuration 320 that matches the reported root-cause observation. In the current example, this query would reveal the above describe remediation action that increases the memory assignment for processes that crash due to memory outage events.

The automation management system may then apply the remediation action by changing the configuration/command line of the identified backend process. In addition, the automation management system may notify operation and development personnel (responsible SREs and developers) about the occurred SLO violation and the applied remediation action via a connected notification tool 454.

Referring now to FIGS. 7*a*-7*b* which provide flow charts of processes that may be used to perform maintenance or adaptation tasks on the automation system.

FIG. 7*a* shows a process describes the exchange of a concrete automation service by an OPS engineer. Typically, OPS engineers may update concrete automation services when new, enhanced versions of those services are available, they may exchange concrete services if other, alternative services implementations that better match the requirements of the automation system are available.

The process starts with step 700, when an OPS engineer receives a request to update or exchange an existing concrete service. In following step 701, the OPS engineer installs the new concrete service. In step 701 the OPS engineer may either install a new instance of the service that is reachable via another request endpoint or update an already existing service instance to a new, improved version. An update of an existing service may also introduce changes to the request endpoint of the service.

In following step 702 the OPS engineer may fetch the abstract service record 230 which corresponds to the updated concrete service. In subsequent step 703 the OPS engineer may adapt the concrete service interface data 233 of the fetched abstract service record 230 to match the endpoint of the new installed or updated concrete service. Step 703 may e.g. include changing a request URL, request parameter names or mapping rules that map abstract service request parameters to concrete service request parameters. In following optional step 704 the OPS engineer may uninstall the old concrete service instance if it is no longer needed. The process then ends with step 705. FIG. 7*a* shows the benefits of decoupling the application specific automation configuration from application independent automation services and tools by introducing abstract services 230. The decoupling prevents concrete service specific configuration data from being used in other service configs or in an automation configuration. This separation eases the exchange and maintenance of concrete services, as it keeps those changes local to the affected service.

FIG. 7*b* describes registration of a new abstract service by an SRE engineer. The registration of new abstract services may be required if the delivery automation is extended, e.g. with new test types that require additional tools for execution and evaluation. The process starts with step 710, when an SRE engineer requests the installation of a new abstract service. In step 711 the SRE engineer may identify a concrete service that matches the requirements of the new automation steps and requests the installation of an instance of the new service, e.g. from an OPS engineer. After the installation of the concrete service instance is finished, the SRE engineer may create an abstract service config 230, set its service identifier 231, its topic subscriptions 232 and concrete service interface data 233 to make the service accessible by the automation workflow engine and to provide mapping data to translate abstract service requests issued by the automation workflow engine to concrete service requests that can be processed by the new installed concrete service.

Afterwards, the SRE engineer may determine in step 713 whether the new abstract service enables new types of automation steps or is only an alternative for already installed abstract services and does not provide new automation steps variants. In case no new automation variants are provided by the abstract service, the process ends with step 715. Otherwise, step 714 is executed in which the SRE engineer may introduce new types or variants of automation steps which may subsequently be used in automation configurations 218. In addition, the SRE engineer may also define mappings from those new automation steps to service request events 224 that may be sent by the automation workflow engine 210 to execute the new automation steps.

FIG. 7*c* describes the change of an automation process config as e.g. performed by an SRE engineer. The process starts with step 720 when a change of an automation process configuration (i.e. a change of a delivery automation configuration 300, by e.g. adding new state configurations 301 that define new automation steps) is required. In following step 721 the SRE engineer may determine whether new abstract services are required for planned change of the automation process. In case new abstract services are required, step 722 is performed in which the new abstract services are installed as e.g. described in FIG. 7*b*. After step 722, or if no new abstract services are required, step 723 is performed in which the SRE engineer may change the automation process configuration as desired. The process then ends with step 724.

FIGS. 7*a*, 7*b* and 7*c* show the benefits of the proposed separation of concerns between the SRE role and the OPS role introduced. The SRE engineer remains focused on its core tasks of improving the reliability of the produced and delivered software by improving the delivery automation system, without being distracted by various configuration tasks required by different specific automation tools. The individual concrete services are isolated from each other and also from the overall automation/pipeline configuration that uses them, which greatly eases management and maintenance of those services by DEV engineers as changes to a specific concrete services have no impact on other concrete services or require changes to automation configurations.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for automatic software delivery, comprising:

a plurality of software services accessible in an execution environment of a computer;

a workflow engine configured to receive a trigger event and convert the trigger event into a series of deployment tasks, where the trigger event contains a run identifier and identifies at least one software component to be deployed into the execution environment and where each of the deployment tasks in the series of deployment tasks are expressed in declarative form;

where converting the trigger event into a series of deployment tasks includes fetching an automation configuration from an automation configuration repository for the trigger event, where the automation configuration contains a series of steps and conditions, and the series of steps and conditions are used to create the series of deployment tasks;

where, upon receiving the trigger event, the workflow engine creates an automation run status record for the trigger event, wherein the automation run state record contains the run identifier and current state information, such that the current state information is used to select a given task from the series of deployment tasks;

a service request handler interconnected via a data bus to the workflow engine and configured to receive a given task of the series of deployment tasks from the workflow engine, wherein the service request handler formulates a service request for a particular software service in the plurality of software services based on the given task and issues the service request to the particular software service, where the service request is expressed in an imperative form and in accordance with an interface for the particular software service;

where the particular software service returns a response for the service request to the service request handler;

the service request handler formulates a service result event for the response, where the service result event includes the run identifier and a pass/fail indicator, and the service request handler forwards the service result event to the workflow engine;

where the workflow engine selects the automation run status record using the run identifier of the service request result and updates the current state information of the automation run status record using the pass/fail indicator of the service result, such that a next task in the series of deployment tasks is executed upon an indication of a successful automation run by the pass/fail indicator or the current automation run is stopped upon an indication of a failed automation run by the pass/fail indicator;

a remediation registry that stores one or more service level objectives along with a remediation action for each service level objective, where the one or more service level objectives specify an expected value or range of values for a service level indicator; and a remediation manager configured to receive a notification describing a performance anomaly of a service level indicator and retrieves a service level objective corresponding to the performance anomaly from the remediation registry wherein the remediation manager compares a metric for the service level indicator received in the notification to the expected value or range of values for the service level indicator retrieved from the remediation registry, and performs the remediation action in response to the metric for the service level indicator received in the notification exceeding the expected value or range of values for the service level indicator retrieved from the remediation registry.

2. The system of claim 1 wherein the workflow engine converts the trigger event into a series of deployment tasks by retrieving a process definition from a data repository using the trigger event, where the process definition includes the series of deployment tasks.

3. The system of claim 1 wherein the workflow engine communicates with the service request handler over the data bus using a publish-subscribe messaging pattern.

4. The system of claim 3 wherein the data bus is organized into topics, each deployment task is published to a given topic, and the service request handler is subscribed to at least one topic of the data bus.

5. The system of claim 1 wherein the remediation manager adapts the remediation action according to degree in which the metric for the service level indicator varies from the expected value or range of values for the service level indicator retrieved from the remediation registry.

6. The system of claim 1 wherein the remediation manager adapts the remediation action based on another performance anomaly which occurred in the past.

7. The system of claim 1 further comprises a transaction agent instrumented in a process executing in the distributed computing environment, where the transaction agent captures monitoring data regarding execution of a computer transaction being executed in the distributed computing environment and sends the monitoring data across a computer network to a causation module, and the causation module identifies the performance anomaly based in part of the monitoring data.

8. The system of claim 1 wherein the remediation manager compares a metric for the service level indicator received in the notification to the expected value or range of values for the service level indicator retrieved from the remediation registry, and performs the remediation action in response to the metric for the service level indicator received in the notification exceeding the expected value or range of values for the service level indicator retrieved from the remediation registry.

9. The system of claim 1 wherein the remediation manager analyzes causation data for the given abnormal operating condition to identify a root cause, retrieves a remediation action from the remediation registry using the root cause and performing the remediation action retrieved from the remediation registry, where the notification includes the causation data.

10. The system of claim 9 wherein the causation data is in form of a directed graph, where nodes of the directed graph describe abnormal operating conditions and edges in the directed graph describe causal relationships between the abnormal operating conditions.

11. The system of claim 10 wherein the remediation manager analyzes the causation data by selecting node in the directed graph corresponding to the given abnormal operating condition and traversing the directed graph.

12. The system of claim 1, wherein the given task contains a service identifier identifying an abstract service record containing concrete service data, wherein formulating the service request includes selecting an abstract service record for the service identifier and applying the concrete service data for formulating the service request.

* * * * *